United States Patent [19]
Kato

[11] Patent Number: 6,038,053
[45] Date of Patent: Mar. 14, 2000

[54] COLOR IMAGE FORMING APPARATUS

[75] Inventor: Manabu Kato, Kawasaki, Japan

[73] Assignee: Canon Kabushiki Kaisha, Tokyo, Japan

[21] Appl. No.: 09/240,843

[22] Filed: Feb. 1, 1999

[30] Foreign Application Priority Data

Feb. 4, 1998 [JP] Japan .................................. 10-038181
Feb. 6, 1998 [JP] Japan .................................. 10-041274

[51] Int. Cl.$^7$ .................................................. G02B 26/08
[52] U.S. Cl. ........................... 359/205; 359/207; 359/216
[58] Field of Search .................................. 359/204–207, 359/216–219, 17, 19; 347/225, 232, 233, 241–244, 258–261

[56] References Cited

U.S. PATENT DOCUMENTS

| | | | |
|---|---|---|---|
| 3,995,110 | 11/1976 | Starkweather | 359/217 |
| 4,864,419 | 9/1989 | Saito et al. | 358/300 |
| 5,182,575 | 1/1993 | Kato et al. | 346/108 |
| 5,436,645 | 7/1995 | Uemura et al. | 346/107 |
| 5,557,446 | 9/1996 | Kato | 359/206 |
| 5,838,480 | 11/1998 | McIntyre et al. | 359/205 |

FOREIGN PATENT DOCUMENTS 7-128603  5/1995  Japan .
8-76011   3/1996  Japan .

*Primary Examiner*—James Phan
*Attorney, Agent, or Firm*—Fitzpatrick, Cella, Harper & Scinto

[57] ABSTRACT

A color image forming apparatus includes a light source, a light deflector for deflecting a light beam emitted by the light source, an image carrier, an optical system for guiding the light beam emitted by the light source onto a surface of the image carrier, and a plurality of scanning optical devices each having the light source, deflector and optical system. A distance from a rotation axis of the deflector to the image carrier is smaller than a length of an effective scanning range on the image carrier. An incidence angle of the light beam which becomes incident on the image carrier in a main scanning plane is not more than 27° in the entire effective scanning range.

48 Claims, 16 Drawing Sheets

COLOR IMAGE FORMING APPARATUS

BACKGROUND OF THE INVENTION

1. Field of the Invention

The present invention relates to a color image forming apparatus and, more particularly, to an apparatus which records color image information by optically scanning the surfaces of a plurality of image carriers with a plurality of corresponding light beams output from a plurality of scanning optical devices, and is suitable for an apparatus such as a laser beam printer, color digital copying machine, or the like having a color electrophotography process.

2. Related Background Art

In a conventional scanning optical device used in a laser beam printer (LBP), digital copying machine, or the like, a light beam which is optically modulated in accordance with an image signal and is output from a light source means is periodically deflected by a light deflector such as a rotary polygonal mirror, and is focused to form a beam spot on the surface of a photosensitive recording medium (photosensitive drum) by a scanning optical element (imaging element) having f-θ characteristics. The beam spot is scanned on that surface to record an image.

FIG. 1 is a schematic sectional view showing principal parts of a conventional scanning optical device of this type.

Referring to FIG. 1, a divergent light beam emitted by a light source means 91 is converted into a nearly collimated light beam by a collimator lens 92, and the light beam (light amount) is limited by a stop 93. Then, the light beam enters a cylinder lens (cylindrical lens) 94 having a predetermined refractive power in only the sub-scanning direction. Of the nearly collimated light beam that enters the cylinder lens 94, light components in the main scanning section directly emerge as a nearly collimated light beam. On the other hand, in the sub-scanning section, light components are focused to form a nearly linear image on a deflection surface (reflection surface) 95a of a light deflector 95 that comprises a rotary polygonal mirror. Note that the main scanning section indicates a light beam section temporarily formed by a light beam deflected and reflected by the deflection surface of the light deflector. On the other hand, the sub-scanning section indicates a section which includes the optical axis of an f-θ lens and is perpendicular to the main scanning section.

The light beam deflected and reflected by the deflection surface 95a of the light deflector 95 is guided onto a photosensitive drum surface 98 via a scanning optical element (f-θ lens) 96 having f-θ characteristics. By rotating the light deflector 95 in the direction of an arrow A, the light beam scans the photosensitive drum surface 98 in the direction of an arrow B. In this way, an image is recorded on the photosensitive drum surface 98 as a recording medium.

FIG. 2 is a schematic view showing principal parts of a color image forming apparatus which records image information in units of colors on different photosensitive drum surfaces by simultaneously using a plurality of scanning optical devices described above, thus forming a color image.

Referring to FIG. 2, the color image forming apparatus comprises scanning optical devices 101, 102, 103, and 104, photosensitive drums 111, 112, 113, and 114 serving as image carriers, developers 121, 122, 123, and 124, and a conveyor belt 131. In the color image forming apparatus shown in FIG. 2, the four scanning optical devices (101, 102, 103, 104) are placed at neighboring positions, respectively correspond to C (cyan), M (magenta), Y (yellow), and B (black), and in parallel record image signals on the surfaces of the photosensitive drums 111, 112, 113, and 114 to print a color image at high speed.

In such a color image forming apparatus, since an image is formed by superposing a plurality of scanning lines, it is especially important to minimize scanning line errors (also referred to as "registration errors" hereinafter) among the respective colors. For this purpose, the scanning optical device is required to:

(a) shorten the optical path length of the optical system so as to minimize scanning line errors due to initial conditions (manufacturing errors, changes upon installation, and the like) and environmental conditions (temperature elevation and the like); and (b) reduce the incidence angle to the surface to be scanned in the main scanning plane so as to minimize errors in magnification in the main scanning direction due to attachment errors of a photosensitive drum (or a cartridge containing it) and decentered rotation of the drum itself.

Japanese Patent Application Laid-Open No. 7-128603 discloses an example wherein a scanning optical system for a scanning optical device used in a color image forming apparatus is constructed by a glass lens and glass cylinder mirror. In this reference, although the incidence angle of a light beam onto the surface to be scanned is small, since the optical path length of the optical system is as large as about 400 mm, the device is readily influenced by the above-mentioned variations, and the entire device becomes bulky.

Japanese Patent Application Laid-Open No. 8-76011 discloses an example in which a scanning optical system for a scanning optical device is constructed by a single toric lens. In this reference, although the optical path length of the optical system is short, the incidence angle of a light beam onto the surface to be scanned is as large as $\theta_i=30°$, and the device is readily influenced by decentered rotation of the photosensitive drum.

SUMMARY OF THE INVENTION

It is an object of the present invention to provide a compact color image forming apparatus having a plurality of scanning optical devices, which can minimize registration errors due to variations in, e.g., initial conditions of the color image forming apparatus main body and environmental changes conditions and can reduce color misregistration by a simple arrangement, by setting each scanning optical device so that the distance from the rotation axis of a deflection element of that scanning optical device to a corresponding image carrier is smaller than the length of an effective scanning range in the image carrier, and an incidence angle $\theta_i$ of a light beam incident on the image carrier surface in the main scanning plane is equal to or smaller than 27° in the entire effective scanning range.

A color image forming apparatus according to the present invention, has a plurality of scanning optical devices, each including light source means, a deflection element for deflecting a light beam emitted by the light source means, and optical means for guiding the light beam emitted by the light source means onto the surface to be scanned, guides a plurality of light beams output from the individual scanning optical devices onto a plurality of corresponding image carrier surfaces, and forms a color image by scanning the plurality of image carrier surfaces with the plurality of light beams. The apparatus is characterized in that each of the plurality of scanning optical devices is set so that the distance from the rotation axis of the deflection element in that scanning optical device to the corresponding image carrier is smaller than the length of an effective scanning range on that image carrier, and an incidence angle $\theta_i$ of a light beam that becomes incident on the image carrier in the main scanning plane is equal to or smaller than 27° in the entire scanning range.

The color image forming apparatus of the present invention is characterized in that the light source means includes a semiconductor laser, the optical means has a first optical element for converting the light beam emitted by the light source means into a substantially collimated light beam, a second optical element for focusing the converted substantially collimated light beam to form a linear image, which is elongated in the main scanning direction of the deflection surface of the deflection element, and a third optical element for focusing the light beam deflected by the deflection element to form a beam spot on the image carrier surface, and the third optical element has a fourth optical element including at least one refractive optical element, and a fifth optical element including at least one diffractive optical element.

The color image forming apparatus of the present invention is characterized in that the fourth optical element has a plastic toric lens, and the fifth optical element has a compound optical element that includes a combination of a cylinder lens and diffractive optical element, the fourth optical element has a plastic toric lens and first diffractive optical element, and the fifth optical element has a compound optical element that includes a combination of a cylinder lens and second diffractive optical element, the fifth optical element is formed of plastic, or a maximum exit angle $\theta_p$ the light beam deflected by the deflection element makes with the optical axis of the third optical element is set to fall within a range from 40° to 60°.

The color image forming apparatus of the present invention is characterized in that the optical means has an optical element including refractive and diffractive portions, and a change in aberration in the main scanning direction on the image carrier surface due to environmental variations of the scanning optical device is corrected by changes in power of the refractive and diffractive portions of the optical element.

Preferably, the apparatus is characterized in that the change in aberration in the main scanning direction is a change in magnification, the change in aberration in the main scanning direction is a change in focus, or the like.

The color image forming apparatus of the present invention is characterized in that the optical means has an optical element including refractive and diffractive portions, and changes in aberration in the main scanning and sub-scanning directions on the image carrier surface due to environmental variations of the scanning optical device are corrected by changes in power of the refractive and diffractive portions of the optical element.

Preferably, the apparatus is characterized in that the change in aberration in the main scanning direction is a change in magnification and/or a change in focus, and the change in aberration in the sub-scanning direction is a change in focus.

This apparatus is characterized in that the refractive portion of the optical element has a plastic toric lens having different powers in the main scanning and sub-scanning directions, and the diffractive portion of the optical element has a diffractive optical element having different powers in the main scanning and sub-scanning directions, the refractive portion of the optical element has a plastic toric lens having different powers in the main scanning and sub-scanning directions and a cylinder lens having a power in the main scanning direction, the diffractive portion of the optical element has a diffractive optical element having different powers in the main scanning and sub-scanning directions, and the cylinder lens and diffractive optical element are combined to form a compound optical element, or the refractive portion of the optical element has a plastic toric lens having different powers in the main scanning and sub-scanning directions and a cylinder lens having a power in the main scanning direction, the diffractive portion of the optical element has a first diffractive optical element having a power in the main scanning direction and a second diffractive optical element having different powers in the main scanning and sub-scanning directions, the first diffractive optical element is placed in the vicinity of the toric lens, and the cylinder lens and second diffractive optical element are combined to form a compound optical element.

DETAILED DESCRIPTION OF THE PREFERRED EMBODIMENTS

Figure 1:
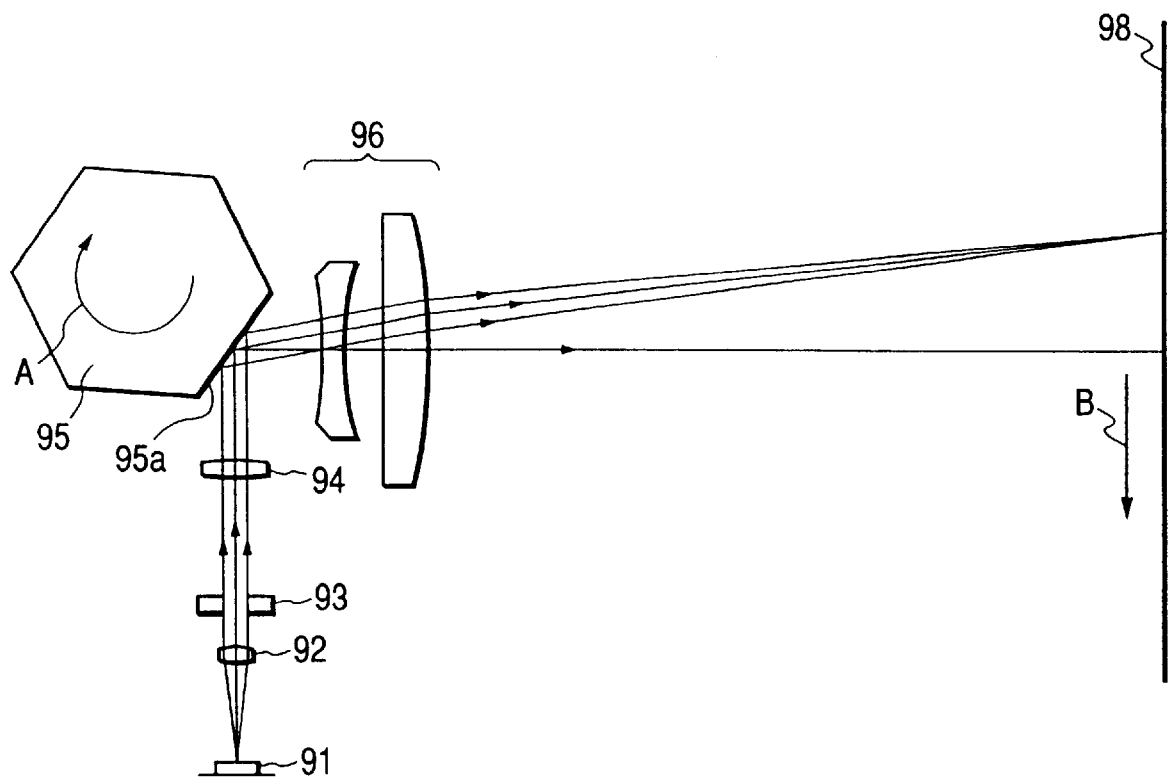
FIG. 1 is a sectional view of principal parts of a conventional scanning optical device in the main scanning direction.
Figure 2:
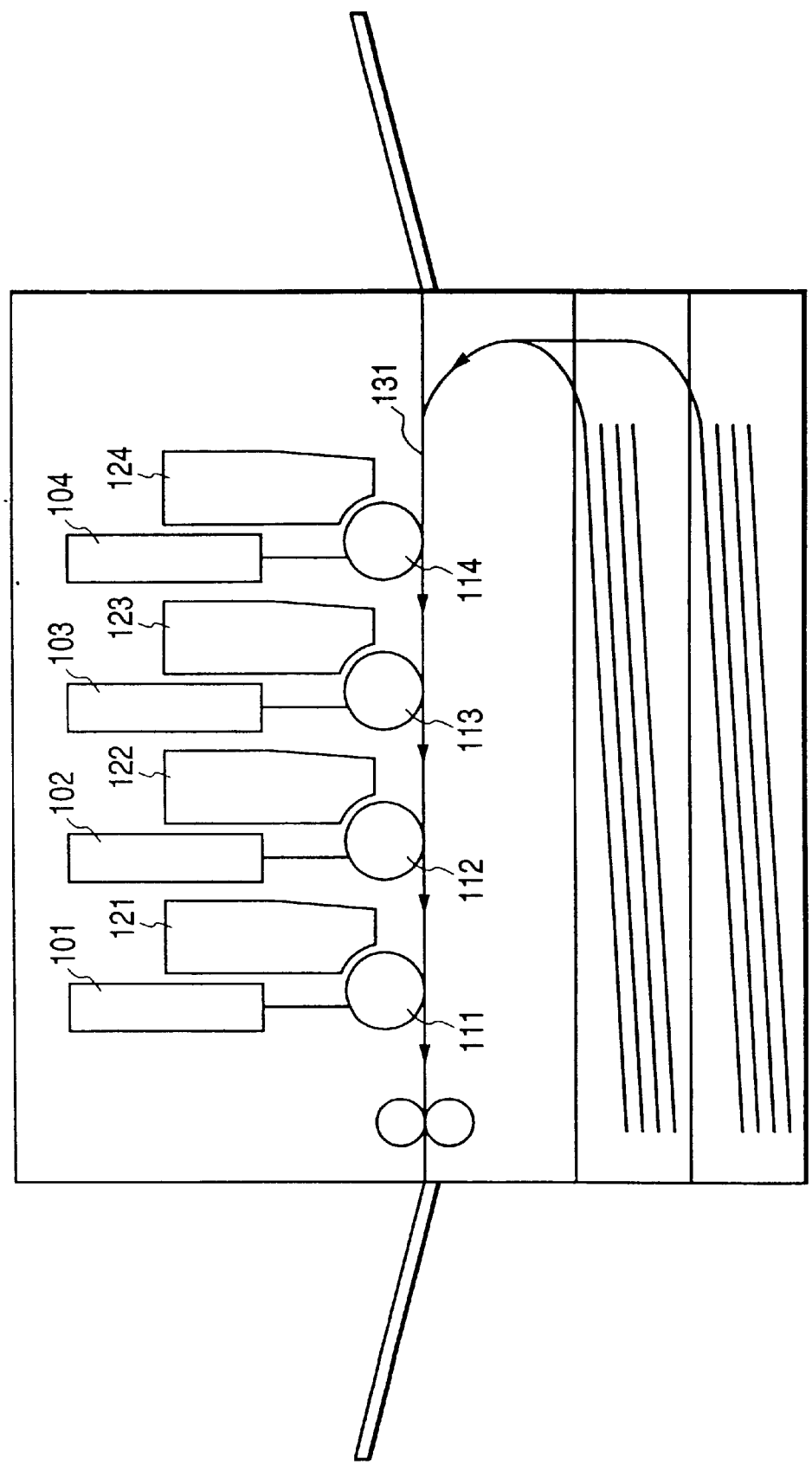
FIG. 2 is a schematic view showing principal parts of a conventional color image forming apparatus.
Figure 3:
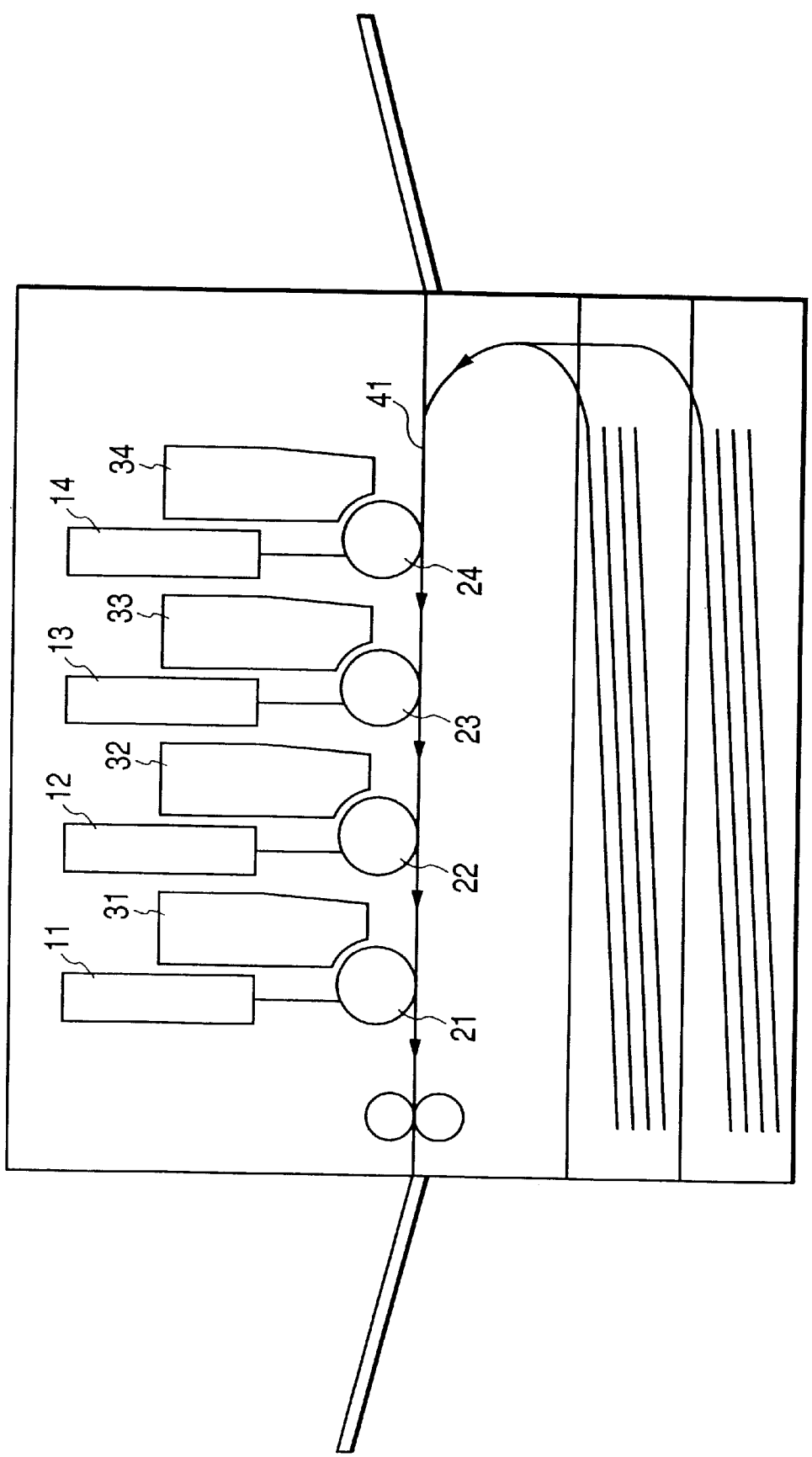
FIG. 3 is a schematic view showing principal parts of a color image forming apparatus according to the first embodiment of the present invention.

FIG. 3 is a schematic view showing principal parts of a color image forming apparatus according to the first embodiment of the present invention.

Referring to FIG. 3, the apparatus comprises scanning optical devices 11, 12, 13, and 14, photosensitive drums 21, 22, 23, and 24 serving as image carriers, developers 31, 32, 33, and 34, and a conveyor belt 41. In the color image forming apparatus of this embodiment, as will be described below, the four scanning optical devices (11, 12, 13, 14), can minimize registration errors due to variations in initial conditions (manufacturing errors, changes upon installation, and the like) and environmental conditions (temperature elevation and the like) and can reduce color misregistration. The optical devices (11, 12, 13, 14) are placed at neighboring positions, respectively correspond to C (cyan), M (magenta), Y (yellow), and B (black), and in parallel record image signals (image information) on the surfaces of the photosensitive drums 21, 22, 23, and 24 to print a color image at high speed.

A method of minimizing registration errors due to variations in various parameters and reducing color misregistration and an optical element used in this method as the characteristic features of the present invention will be explained below. Note that the plurality of scanning optical devices 11, 12, 13, and 14 that construct the color image forming apparatus have the same arrangements and optical effects, and the scanning optical device 11 will be explained below by way of example.

Figure 4:
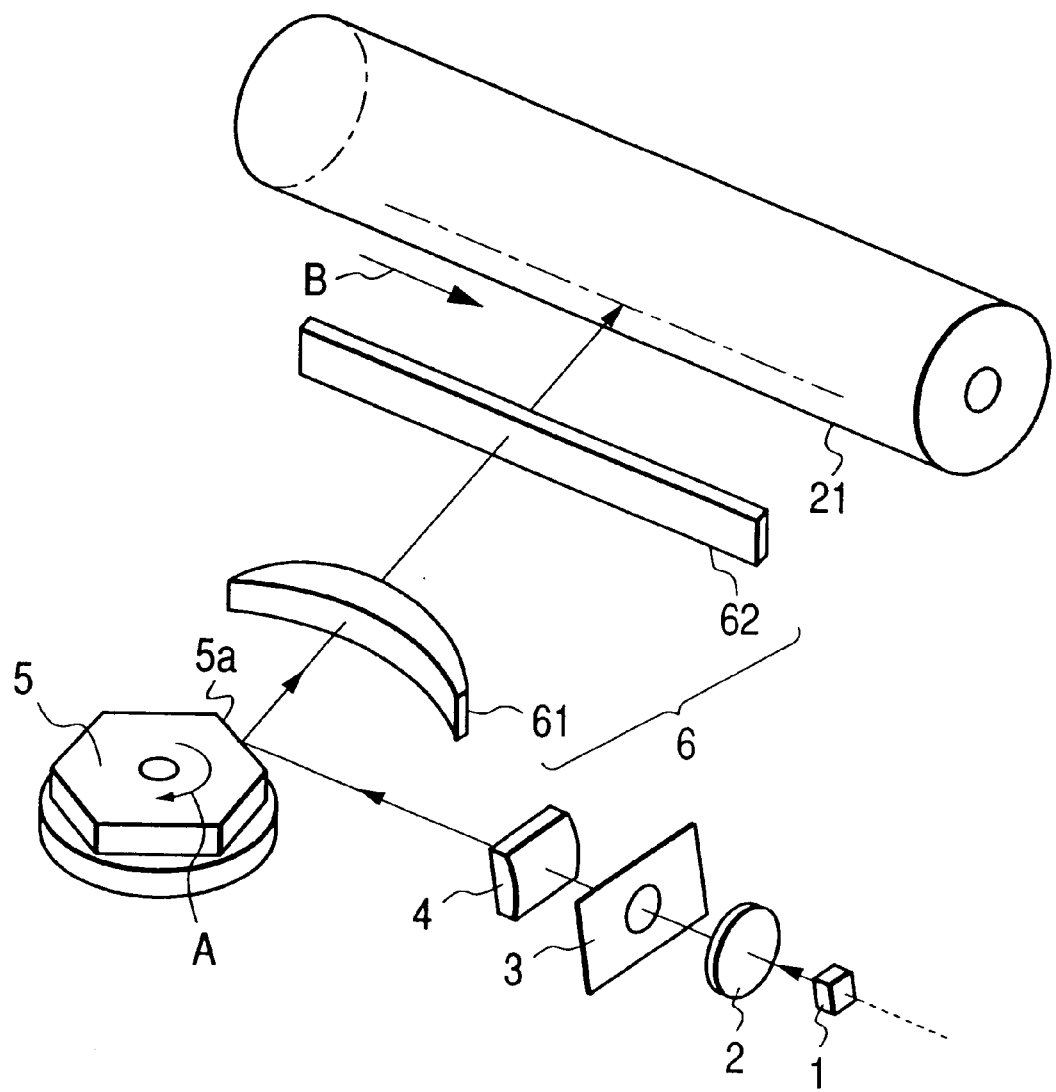
FIG. 4 is a schematic view showing principal parts of a scanning optical device shown in FIG. 3 and a corresponding image carrier.
Figure 5:
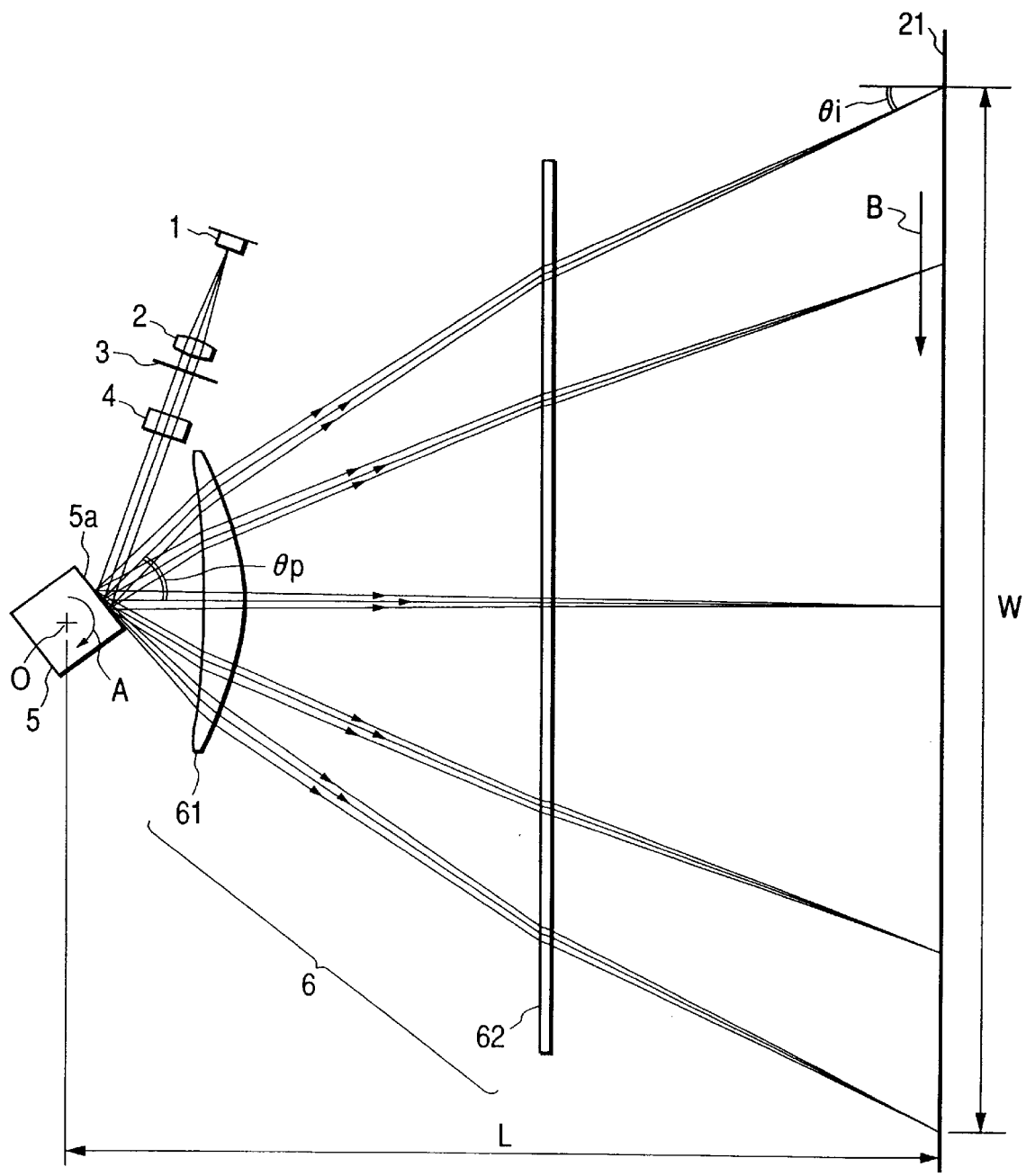
FIG. 5 is a sectional view showing principal parts of an optical system shown in FIG. 4 in the main scanning direction.

FIG. 4 is a schematic view showing principal parts of this scanning optical device 11 and the corresponding image carrier 21, and FIG. 5 is a sectional view (main scanning sectional view) showing principal parts of an optical system shown in FIG. 4 in the main scanning direction.

Referring to FIGS. 4 and 5, a light source means 1 comprises, e.g., a semiconductor laser. A collimator lens 2 serves as a first optical element, and converts a divergent light beam emitted by the light source means 1 into a nearly collimated light beam. An aperture stop 3 limits a light beam (light amount) that passes through it. A cylindrical lens (cylinder lens) 4 serves as a second optical element, and has a predetermined refractive power in only the sub-scanning direction perpendicular to the plane of paper of FIG. 5. The lens 4 focuses the light beam that has passed through the aperture stop 3 to form a linear image, which is elongated in the main scanning direction, on a deflection surface 5a of a light deflector 5 (to be described below).

The light deflector 5 serves as a deflection element and comprises, e.g., a polygonal mirror (rotary polygonal mirror). The deflector 5 is rotated at a constant speed in the direction of an arrow A in FIG. 4 by a drive means (not shown) such as a motor or the like.

A scanning optical element 6 serves as a third optical element having f-θ characteristics, and has a fourth optical element including at least one refractive optical element, and a fifth optical element including at least one diffractive optical element. The fourth optical element in this embodiment comprises a plastic toric lens 61 having different powers in the main scanning and sub-scanning directions, and the two surfaces of the toric lens 61 in the main scanning direction have an aspherical shape. The fifth optical element comprises an elongated diffractive optical element 62 having different powers in the main scanning and sub-scanning directions. In this embodiment, the toric lens 61 is placed on the light deflector 5 side of the middle point between a rotation axis O of the light deflector 5 and the surface of the photosensitive drum 21 (the surface to be scanned), and the diffractive optical element 62 is placed on the side of the surface of the photosensitive drum 21 of the middle point. The scanning optical element 6 images a light beam based on image information deflected by the light deflector 5 on the surface of the photosensitive drum 21, and corrects any tilt of the deflection surface 5a of the light deflector 5 in the sub-scanning section. Note that the diffractive optical element 62 in this embodiment is a plastic element manufactured by injection molding. However, the present invention is not limited to such a specific element, and a diffraction grating may be manufactured on a glass substrate by replica to obtain the same effect.

In this embodiment, the respective elements (scanning optical element) are set so that a distance L from the rotation axis O of the light deflector 5 to the surface of the photosensitive drum 21 (the surface to be scanned) is shorter than a length W of the effective scanning range on the surface of the photosensitive drum 21, and an incidence angle $\theta_i$ of a light beam that strikes the surface of the photosensitive drum 21 in the main scanning plane is equal to or smaller than 27° in the entire effective scanning range. Also, in this embodiment, a maximum exit angle $\theta_p$ the light beam deflected by the light deflector 5 makes with the optical axis of the scanning optical element 6 falls within the range from 40° to 60°.

The color image forming apparatus of this embodiment forms latent images on the surfaces of the corresponding photosensitive drums 21, 22, 23, and 24 using light beams based on modulation signals by the four scanning optical devices 11, 12, 13, and 14, as described above. For example, C (cyan), M (magenta), Y (yellow), and B (black) latent images are formed on the surfaces of the corresponding photosensitive drums 21, 22, 23, and 24, and are then transferred onto a recording member to overlap each other, thus forming a single full-color image.

In the scanning optical device 11 of this embodiment, a divergent light beam emitted by the semiconductor laser 1 is converted into a nearly collimated light beam by the collimator lens 2, and the light beam (light amount) is limited by the aperture stop 3. Then, the light beam enters the cylindrical lens 4. Of the nearly collimated light beam that enters the cylindrical lens 4, light components in the main scanning section directly emerge as a nearly collimated light beam. On the other hand, in the sub-scanning section, light components converge to form a nearly linear image (a linear image elongated in the main scanning direction) on the deflection surface 5a of the light deflector 5. The light beam deflected by the deflection surface 5a of the light deflector 5 is guided onto the surface of the photosensitive drum 21 via the toric lens 61 and the diffractive optical element 62. By rotating the light deflector 5 in the direction of the arrow A, the light beam optically scans the surface of the photosensitive drum 21 in the direction of the arrow B. As described above, C (cyan), M (magenta), Y (yellow), and B (black) latent images are formed on the surfaces of the corresponding photosensitive drums 21, 22, 23, and 24, and are then transferred onto a recording member to overlap each other, thus forming a single full-color image.

The shapes of the toric lens 61 and diffractive optical element 62 that construct the third optical element 6 of the scanning optical device 11 in this embodiment are as follows.

① The toric has an aspherical shape which can be expressed by a function up to the 10-th order in the main scanning direction.

Taking the intersection of the optical axis and the toric lens is an origin, the optical axis direction is defined as an x-axis, an axis perpendicular to the optical axis in the main scanning section is defined as a y-axis, and an axis perpendicular to the optical axis in the sub-scanning section is defined as a z-axis.

The lens shape in the generating-line direction corresponding to the main scanning direction is given by:

(where R is the radius of curvature, and K, $B_4$, $B_6$, $B_8$, $$x = \frac{Y^2/R}{1 + (1 - (1+K)(Y/R)^2)^{1/2}} + B_4Y^4 + B_6Y^6 + B_8Y^8 + B_{10}Y^{10}$$

and $B_{10}$ are aspherical coefficients), and the lens shape in the meridian-line direction corresponding to the sub-scanning direction (a direction including the optical axis and perpendicular to the main scanning direction) is given by:

$$S = \frac{Z^2/r'}{1 + (1 - (Z/r')^2)^{1/2}}$$

for $r' = r_0(1 + D_2Y^2 + D_4Y^4 + D_6Y^6 + D_8Y^8 + D_{10}Y^{10})$ (where $r_0$ is the meridian-line radius of curvature on the optical axis, and $D_2$, $D_4$, $D_6$, $D_8$, and $D_{10}$ are aspherical coefficients)

② The diffractive optical element has a diffraction surface which is expressed by phase functions up to the sixth order in the main scanning direction, and is expressed in the sub-scanning direction by different 2nd-order phase functions depending on the position in the main scanning direction. The expression is given by:

$$\phi = m\lambda = b_2Y^2 + b_4Y^4 + b_6Y^6 + (d_0 + d_1Y + d_2Y^2 + d_3Y^3 + d_4Y^4)Z^2$$

(where $\phi$ is the phase function, m is the order of diffraction, $\lambda$ is the wavelength used, Y is the height from the lens optical axis, $b_2$, $b_4$, $b_6$, $d_0$, $d_1$, $d_2$, $d_3$, and $d_4$ are phase coefficients, and +1st-order diffracted light is used in the first to third embodiments).

Table-1 below shows the optical layout in this embodiment, aspherical coefficients of the toric lens 61, and phase terms of the diffractive optical element 62.

In Table-1, an effective scanning width W (297.0 mm) corresponds to the width of A3 size paper. The effective scanning width W of the present invention indicates a maximum width of a paper sheet that can be printed by a color image forming apparatus.

TABLE 1

First Embodiment

| Design Data Wavelength, Refractive Index Wavelength Used | | $\lambda$(mm) | 780 | Surface Shape of Toric Lens 61 | First Surface | Second Surface | Surface Shape of Elongated Diffractive Element 62 | First Surface | Second Surface |
|---|---|---|---|---|---|---|---|---|---|
| Refractive Index of Toric Lens 61 | nt | 1.5242 | | R | −1.41591E+01 | −6.18036E+01 | R | ∞ | ∞ |
| Refractive Index of Elongated Diffractive Element 62 | nd | 1.5242 | | K | 5.27866E+00 | −6.46577E−01 | K | | |
| Light Ray Angle | | | | B4 | 1.21014E−06 | 4.20445E−07 | B4 | | |
| Polygon Incidence Angle | θp | 70.0 | | B6 | 7.51335E−11 | 2.812267E−10 | B6 | | |
| Polygon Maximum Exit Angle | θe | 45.0 | | r | 1.44405E+02 | −2.51589E+−1 | Phase Function of Elongated Diffractive Element 62 | | |
| Maximum Incidence Angle on Surface to be Scanned | θi | 25.0 | | D2s | | 1.75165E−04 | | First Surface | Second Surface |
| Layout | | | | D4s | −3.02404E−08 | | b2 | −2.50725E−04 | |
| Polygon Axis-Toric Lens | e1 | 36.4 | | D6s | | 3.83856E−11 | b4 | | −4.31479E−08 |
| Toric Lens Central Thickness | d1 | 11.0 | | D2e | | 2.46819E−04 | b6 | | 1.23655E−12 |
| Toric Lens-Elongated Diffractive Element | e2 | 86.0 | | D4e | −9.77441E−08 | | d0 | | −5.78930E−03 |
| Elongated Diffractive Element Central Thickness | d2 | 3.0 | | D6e | | 7.36681E−11 | d1 | | −9.57598E−07 |
| Elongated Diffractive Element-Surface to be Scanned | Sk | 110.0 | | Suffix s indicates laser side | | | d2 | | 1.15549E−07 |
| Polygon Axis-Surface to be Scanned | L | 246.4 | | Suffix s indicates side opposite to laser | | | d3 | | 3.71159E−11 |
| Effective Scanning Width | W | 297.0 | | | | | d4 | | 1.23655E−12 |

Figure 6:
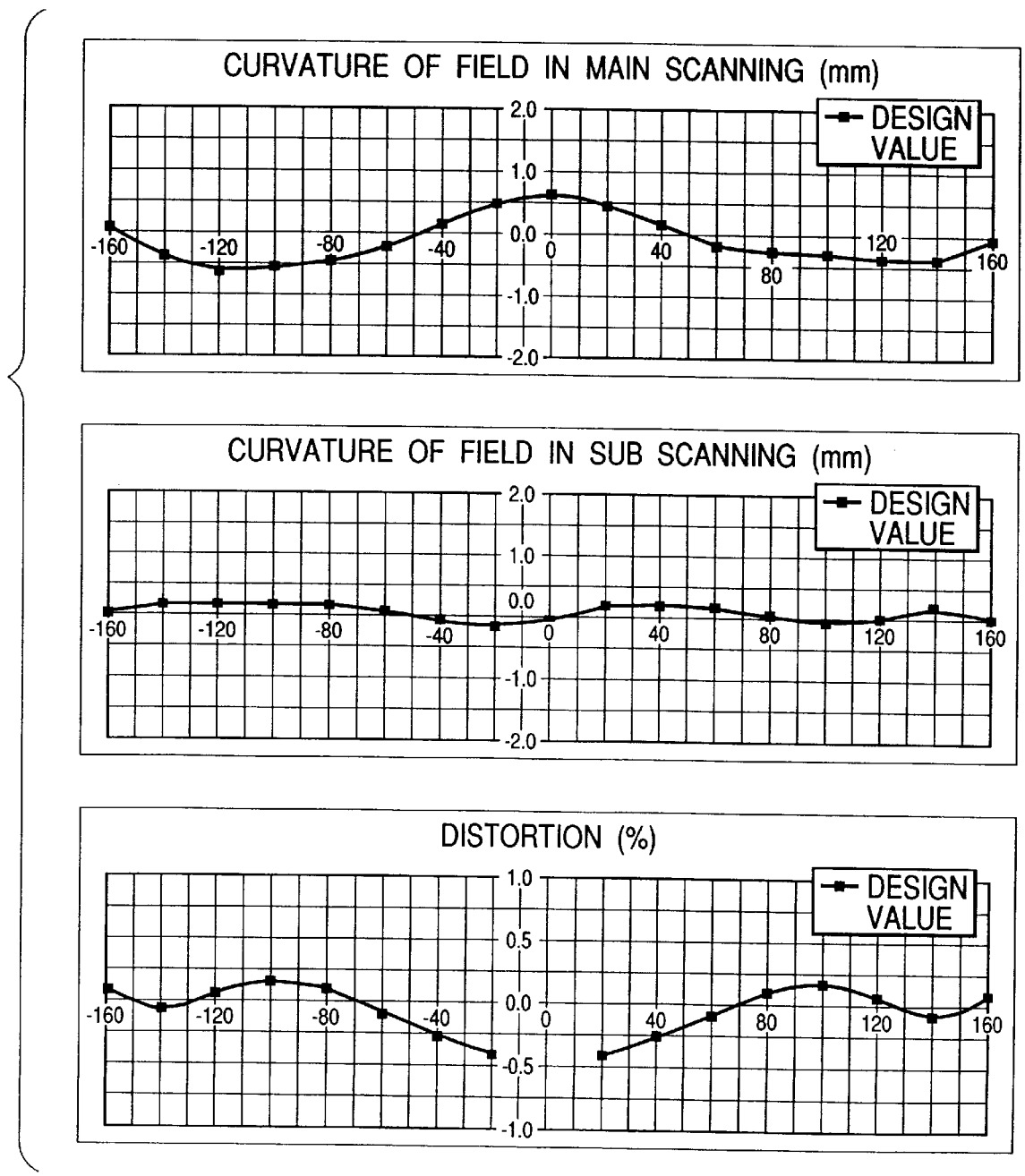
FIG. 6 is a chart showing paraxial aberrations of the scanning optical device in the first embodiment of the present invention.

FIG. 6 is an explanatory view showing paraxial aberrations (curvatures of field in the main scanning and sub-scanning directions, distortion, and the like) in this embodiment. As can be seen from FIG. 6, all the aberrations, i.e., the curvatures of field in the main scanning and sub-scanning directions and distortion, are satisfactorily corrected.

The relationship between a decentered amount dx of the photosensitive drum surface (the surface to be scanned) and an error dy in magnification in the main scanning direction due to decentered rotation and positional deviation of the photosensitive drum will be explained below. Using as a parameter a maximum incidence angle $\theta_i$ of a light beam incident on the photosensitive drum surface in the deflection plane (main scanning plane), these amounts are expressed by:

$$dy = dx \times \tan\theta_i$$

In order to suppress registration errors in units of scanning lines and to eliminate color misregistration on an actual image, the error dy in magnification in the main scanning direction must be less than or equal to suppressed to be half the decentered amount dx of the photosensitive drum surface. For this reason, the respective elements (scanning optical element) must be configured so that the maximum incidence angle $\theta_i$ of a light beam incident on the photosensitive drum surface in the deflection plane satisfies:

$$\tan\theta_i \leq 0.5 \quad \theta_i \leq 27° \tag{1}$$

In this embodiment, the maximum incidence angle of a light beam that hits the surface of the photosensitive drum 21 in the deflection plane is $\theta_i = 25°$, and the error amount dy in magnification in the main scanning direction at that time is:

$$dy = dx \times \tan 25°$$
$$= 0.466 \times dx$$

These values provide a scanning optical system (scanning optical element) which reduces color misregistration due to attachment errors of the photosensitive drum 21 and the like and decentered rotation of the drum 21, and allows accurate registration.

Conditional formula (1) above defines the incidence angle of a light beam incident on the surface of the photosensitive drum 21 in the main scanning plane. If the incidence angle falls outside the range defined by conditional formula (1), the light beam is readily influenced by decentered rotation, positional deviation, and the like of the photosensitive drum 21.

In order to minimize registration errors due to variations in initial conditions (manufacturing errors, changes upon installation, and the like) and environmental conditions (temperature elevation and the like), a compact scanning optical system (scanning optical element) having an optical path length L from the rotation axis of the light deflector to the photosensitive drum surface, that is smaller than the length W of the effective scanning range is required. In this embodiment, the length of the effective scanning range is set at W=297 mm (=A3 size), and the optical path length is set at L=246 mm, thus providing an arrangement that does not readily produce registration errors due to various variations.

In this embodiment, if $\theta_p$ represents the maximum exit angle the light beam deflected by the light deflector 5 makes with the optical axis of the scanning optical element 6, the angle $\theta_p$ falls within the range:

$$40° \leq \theta_p \leq 60° \tag{2}$$

Conditional formula (2) defines the maximum exit angle $\theta_p$ the light beam deflected by the light deflector 5 makes with the optical axis of the scanning optical element 6, and if the exit angle falls outside the range defined by conditional formula (2), the apparatus is readily influenced by various variations, and the entire apparatus becomes bulky. When the exit angle exceeds the upper limit value of the range defined by conditional formula (2), scanning using a polygonal mirror having six surfaces or more cannot be done. Even when a polygonal mirror having five surfaces or less is used, each surface requires a large width, resulting in a large polygonal mirror.

As described above, in this embodiment, since the toric lens 61 placed on the side of the light deflector 5 and the diffractive optical element 62 placed on the side of the surface of the photosensitive drum 21 are used as the scanning optical element 6 of the scanning optical device 11, and the plurality of scanning optical devices 11, 12, 13, and 14 record images on the surfaces of the plurality of photosensitive drums 21, 22, 23, and 24, a low-cost, simple color image forming apparatus which suffers less registration errors among colors can be realized.

Note that the color image forming apparatus of this embodiment comprises a plurality of scanning optical devices and a plurality of corresponding photosensitive drums. However, the present invention also may be similarly applied to an apparatus comprising a single photosensitive drum.

Figure 7:
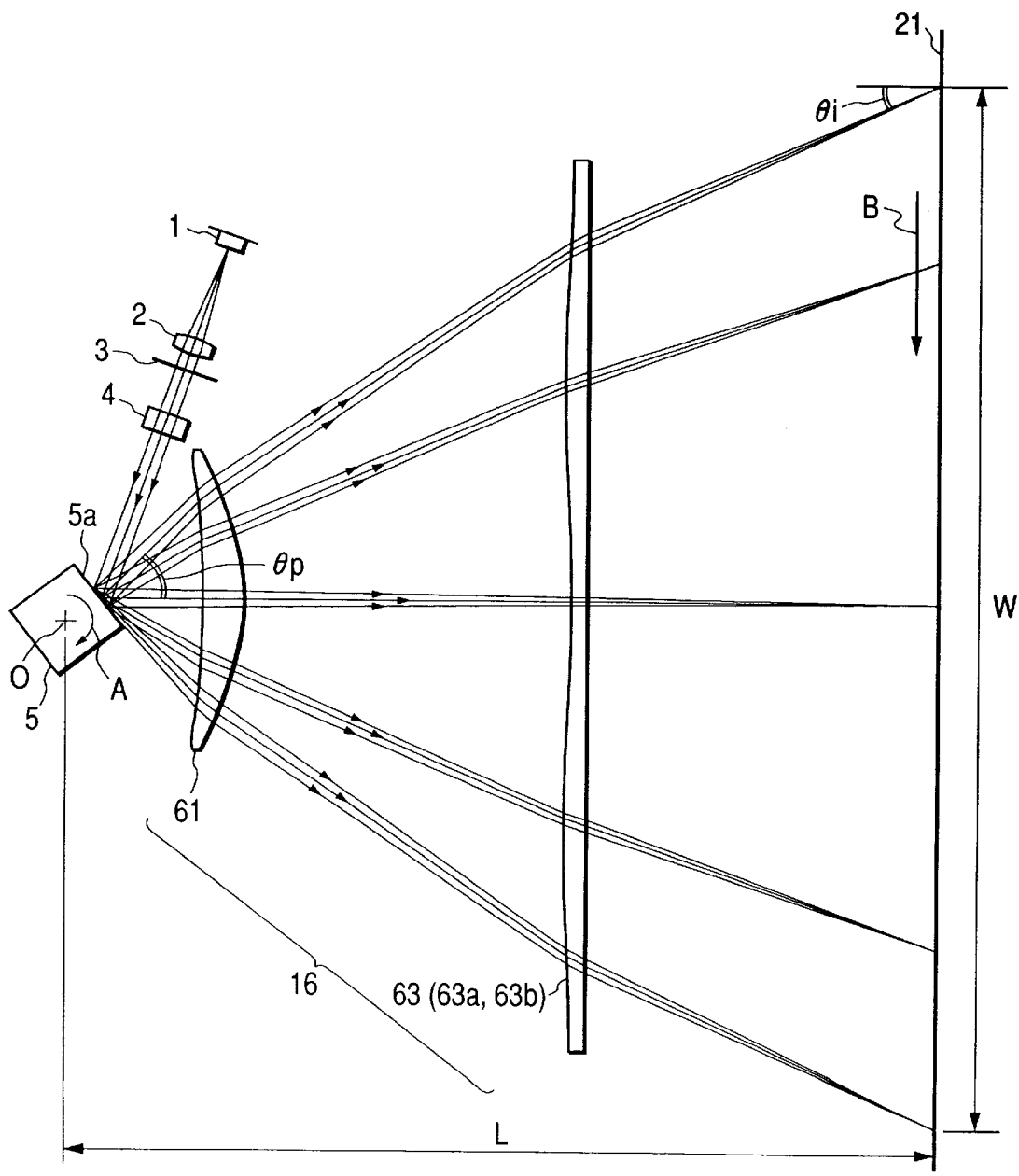
FIG. 7 is a sectional view showing principal parts of an optical system of a scanning optical device, which constructs a color image forming apparatus according to the second embodiment of the present invention, in the main scanning direction.

FIG. 7 is a sectional view of principal parts of an optical system in the main scanning direction, which shows one of a plurality of scanning optical devices that construct a color image forming apparatus according to the second embodiment of the present invention, and a corresponding photosensitive drum. The same reference numerals in FIG. 7 denote the same parts as those in FIG. 5.

This embodiment is different from the first embodiment mentioned above in that a fifth optical element, which is one element of a third optical element 16, is comprised of a compound optical system 63 which combines a cylinder lens (cylindrical lens) 63a having a power in the main scanning direction, and a diffractive optical element 63b having different powers in the main scanning and sub-scanning directions. Other arrangements and optical effects are substantially the same as those in the first embodiment, thus obtaining the same effects.

More specifically, a scanning optical element 16 serves as a third optical element having f-θ characteristics, and has a fourth optical element including at least one refractive optical element, and a fifth optical element including at least one diffractive optical element. The fourth optical element in this embodiment comprises a single, plastic toric lens 61 having different powers in the main scanning and sub-scanning directions. The fifth optical element is comprised of a compound optical element (elongated diffractive element) 63 which combines a single, plastic cylinder lens 63a having a power in the main scanning direction, and a diffractive optical element 63b having different powers in the main scanning and sub-scanning directions.

Table-2 below shows the optical layout in this embodiment, aspherical coefficients of the toric lens 61 and cylinder lens 63a, and phase terms of the difractive optical element 63b.

TABLE 2

Second Embodiment

Wavelength, Refractive Index

| Wavelength Used | λ (mm) | 780 |
|---|---|---|

Design Data

| | | |
|---|---|---|
| Refractive Index of Toric Lens 61 | nt | 1.5242 |
| Refractive Index of Elongated Diffractive Element 63 | nd | 1.5107 |

Light Ray Angle

| | | |
|---|---|---|
| Polygon Incidence Angle | θp | 70.0 |
| Polygon Maximum Exit Angle | θe | 45.0 |
| Maximum Incidence Angle on Surface to be Scanned | θi | 23.0 |

Layout

| | | |
|---|---|---|
| Polygon Axis - Toric Lens | e1 | 36.4 |
| Toric Lens Central Thickness | d1 | 11.0 |
| Toric Lens - Elongated Diffractive Element | e2 | 95.4 |
| Elongated Diffractive Eiement Central Thickness | d2 | 4.5 |
| Elongated Diffractive Element - Surface to be Scanned | Sk | 104.4 |
| Polygon Axis - Surface to be Scanned | L | 251.7 |
| Effective Scanning Width | W | 297.0 |

Toric Lens 61 Surface Shape

| | First Surface | Second Surface |
|---|---|---|
| R | −1.14246E+02 | −5.71091E+01 |
| K | −1.73665E+01 | −6.74236E−01 |
| B4 | 5.11474E−07 | 9.39652E−07 |
| B6 | −4.50306E−11 | 4.43628E−11 |
| r | 1.22177E+02 | −2.45907E+01 |
| D2s | | 1.41912E−04 |
| D4s | | 3.71327E−08 |
| D6s | | 7.74418E−12 |
| D2e | | 2.24525E−04 |
| D4e | | −4.14702E−08 |
| D6e | | 4.80863E−11 |

Surface Shape of Elongated Diffractive Element 63

| | First Surface | Second Surface |
|---|---|---|
| R | −5.93238E+02 | ∞ |
| K | −8.00772E+01 | |
| B4 | 9.56041E−08 | |
| B6 | −5.54072E−12 | |
| B8 | 1.76169E−16 | |
| B10 | −3.12632E−21 | |

Phase Function of Elongated Diffractive Element 63

| | First Surface | Second Surface |
|---|---|---|
| b2 | | −7.94712E−04 |
| b4 | | 1.44880E−08 |
| b6 | | −4.99127E−13 |
| d0 | | −5.70469E−03 |
| d1 | | −8.16645E−07 |
| d2 | | 8.60782E−08 |
| d3 | | 2.48487E−11 |
| d4 | | −1.43657E−12 |

Suffix s indicates taser side
Suffix s indicates side opposite to laser

Figure 8:
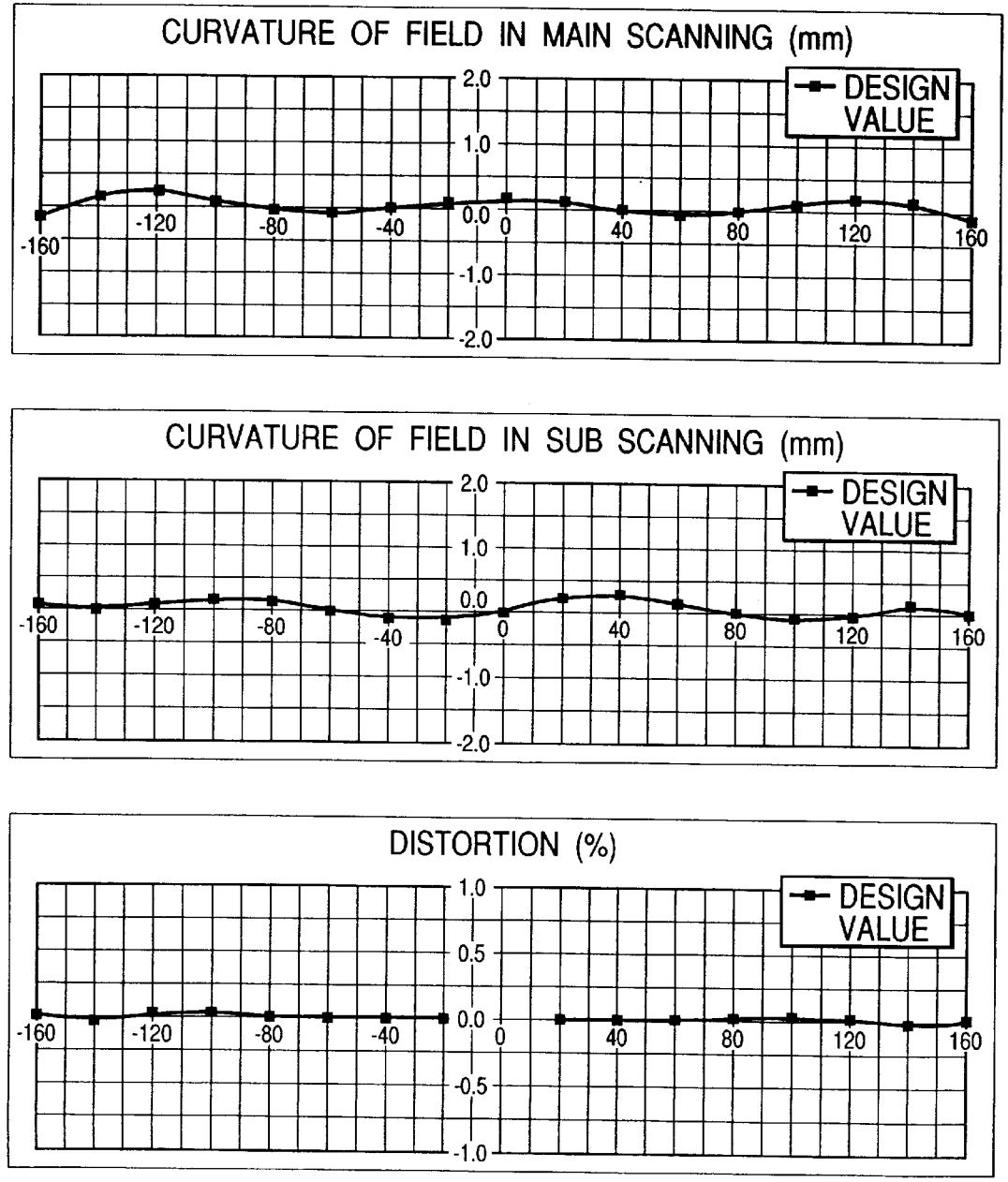
FIG. 8 is a chart showing paraxial aberrations of the scanning optical device in the second embodiment of the present invention.

FIG. 8 is an explanatory view showing paraxial aberrations (curvatures of field in the main scanning and sub-scanning directions, distortion, and the like) in this embodiment. As can be seen from FIG. 8, all the aberrations, i.e., the curvatures of field in the main scanning and sub-scanning directions and distortion, are satisfactorily corrected.

In this embodiment, since the cylinder lens 63a having a power in the main scanning direction is added to the diffractive optical element 63b, the maximum incidence angle $\theta_i$ of a light beam incident on the surface of the photosensitive drum 21 in the deflection plane (main scanning plane) can be as small as $\theta_i$=23.0°, thus providing a scanning optical system (scanning optical element) which reduces color misregistration due to attachment errors of the photosensitive drum 21 and the like and decentered rotation of the drum 21, and allows accurate registration.

Also, in this embodiment, since the optical length L from the rotation axis of the light deflector 5 to the surface of the photosensitive drum 21 is set to be smaller than the length W of the effective scanning range, registration errors due to various variations can be minimized.

As described above, in this embodiment, since the toric lens 61 placed on the side of the light deflector 5 and the compound optical element 63, which is placed on the side of the surface of the photosensitive drum 21 and combines the cylinder lens 63a and diffractive optical element 63b, are used as the scanning optical element 16 of the scanning optical device 11, and the plurality of scanning optical devices 11, 12, 13, and 14 record images on the surfaces of the plurality of photosensitive drums 21, 22, 23, and 24, a low-cost, simple color image forming apparatus which suffers fewer registration errors among colors can be realized.

Figure 9:
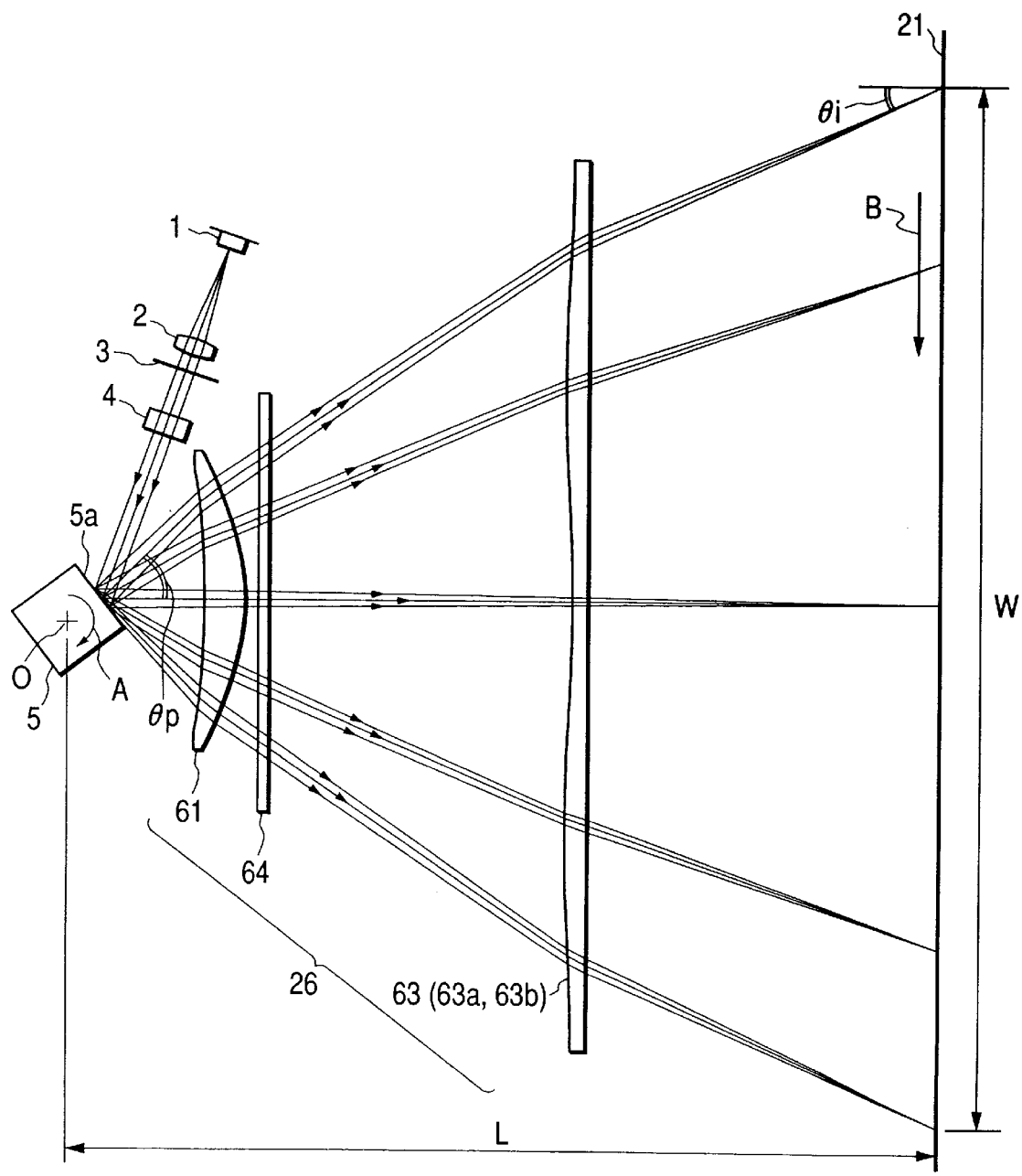
FIG. 9 is a sectional view showing principal parts of an optical system of a scanning optical device, which constructs a color image forming apparatus according to the third embodiment of the present invention, in the main scanning direction.

FIG. 9 is a sectional view of principal parts of an optical system in the main scanning direction, which shows one of a plurality of scanning optical devices that construct a color image forming apparatus according to the third embodiment of the present invention, and a corresponding photosensitive drum. The same reference numerals in FIG. 9 denote the same parts as those in FIG. 7.

This embodiment is different from the second embodiment described above in that a fourth optical element, which is one element of a third optical element 26, is comprised of a toric lens 61 and diffractive optical element 64. Other arrangements and optical effects are the same as those in the second embodiment.

More specifically, referring to FIG. 9, a scanning optical element 26 serves as a third optical element having f-θ characteristics, and has a fourth optical element including at least one refractive optical element, and a fifth optical element including at least one diffractive optical element. The fourth optical element in this embodiment comprises a single, plastic toric lens 61 having different powers in the main scanning and sub-scanning directions, and a first diffractive optical element 64 having a power in the main scanning direction. The fifth optical element is comprised of a compound optical element (elongated diffractive element) 63 that combines a single, plastic cylinder lens 63a having a power in the main scanning direction, and a second diffractive optical element 63b having different powers in the main scanning and sub-scanning directions.

Table-3 below shows the optical layout in this embodiment, aspherical coefficients of the toric lens 61 and cylinder lens 63a, and phase terms of the first and second diffractive optical elements 64 and 63b.

TABLE 3

Third Embodiment

Wavelength, Refractive Index

| Wavelength Used | λ (mm) | 780 |
|---|---|---|

Design Data

| | | |
|---|---|---|
| Refractive Index of Toric Lens 61 | nt | 1.5242 |
| Refractive Index of Diffractive Elements 63 and 64 | nd | 1.5107 |

Light Ray Angle

| | | |
|---|---|---|
| Polygon Incidence Angle | θp | 70.0 |
| Polygon Maximum Exit Angle | θe | 45.0 |
| Maximum Incidence Angle on Surface to be Scanned | θi | 23.0 |

Layout

| | | |
|---|---|---|
| Polygon Axis - Toric Lens | e1 | 36.4 |
| Toric Lens Central Thickness | d1 | 11.0 |
| Toric Lens - Diffractive Element | e2 | 5.0 |
| Central Thickness of Diffractive Element 64 | d2 | 3.0 |
| Diffractive Element - Elongated Diffractive Element | e3 | 92.3 |
| Central Thickness of Elongated Diffractive Element 63 | d3 | 4.0 |
| Elongated Diffractive Element - Surface to be Scanned | Sk | 99.8 |
| Polygon Axis - Surface to be Scanned | L | 251.5 |
| Effective Scanning Width | W | 297.0 |

Toric Lens 61 Surface Shape

| | First Surface | Second Surface |
|---|---|---|
| R | −1.18171E+02 | −5.81314E+01 |
| K | −2.10535E+01 | −7.38177E−01 |
| B4 | 4.43249E−07 | 9.77616E−07 |
| B6 | −4.30166E−11 | −4.41670E−11 |
| r | 1.26289E+02 | −2.37964E+01 |
| D2s | | 1.43129E−04 |
| D4s | | 5.19627E−08 |
| D6s | | −2.39599E−12 |
| D2e | | 2.27016E−04 |
| D4e | | −2.67120E−08 |
| D6e | | 3.69160E−11 |

Elongated Diffractive Element 63 Surface Shape

| | First Surface | Second Surface |
|---|---|---|
| R | −5.78576E+02 | ∞ |
| K | −7.49316E+01 | |
| B4 | 9.37253E−08 | |
| B6 | −5.48771E−12 | |
| B8 | 1.62847E−16 | |
| B10 | −2.55172E−21 | |

Phase Function of Elongated Diffractive Element 63

| | First Surface | Second Surface |
|---|---|---|
| b2 | | −7.58305E−04 |
| b4 | | 1.45517E−08 |
| b6 | | −5.87420E−13 |
| d0 | | −5.70469E−03 |
| d1 | | −8.11880E−01 |
| d2 | | 8.06083E−08 |
| d3 | | 2.37980E−11 |
| d4 | | −1.29714E−12 |

Phase Function of Diffractive Element 64

| | First Surface | Second Surface |
|---|---|---|
| b2 | | −4.60948E−05 |
| b4 | | −2.64568E−09 |
| b6 | | 4.11899E−12 |

Figure 10:
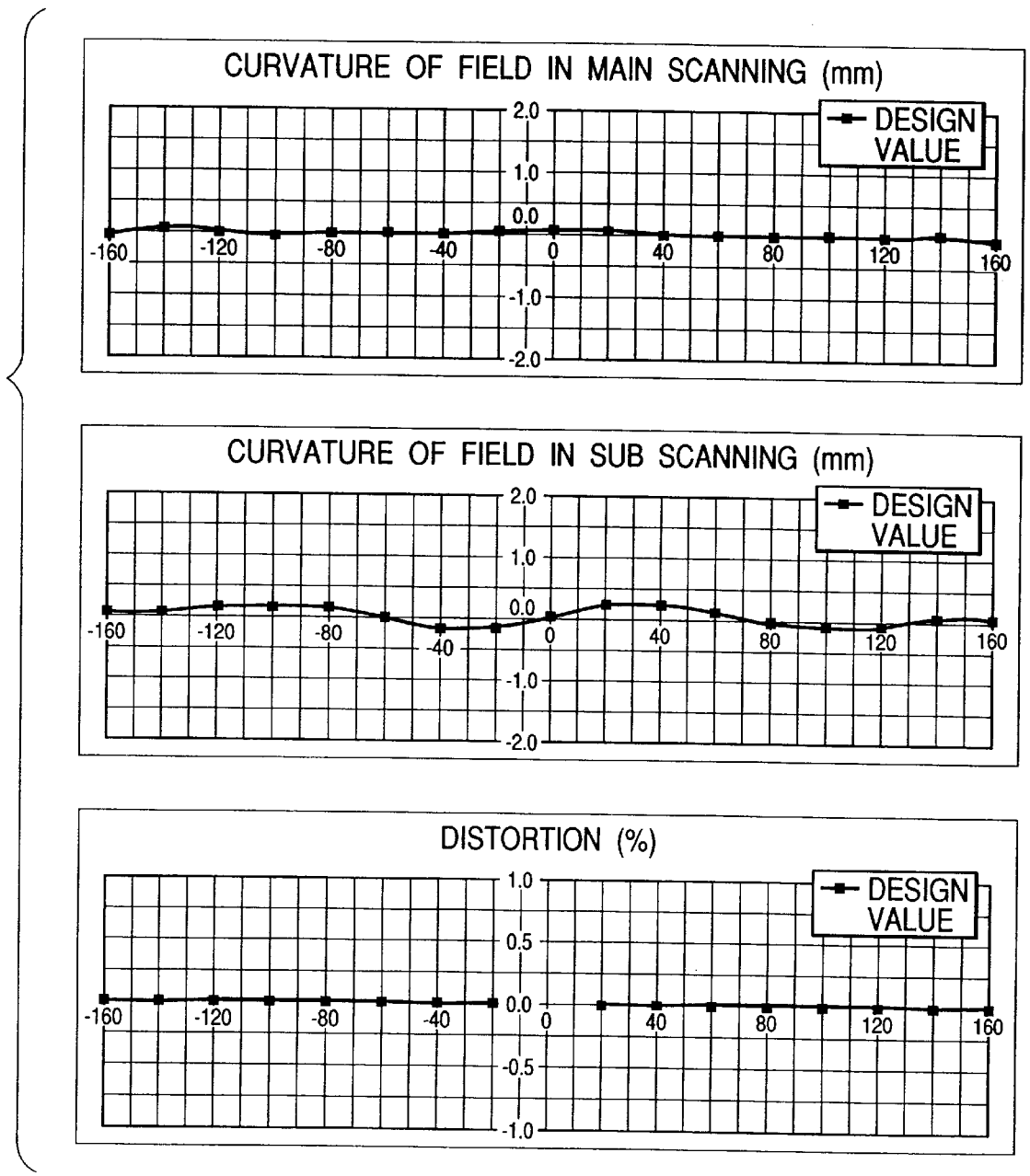
FIG. 10 is a chart showing paraxial aberrations of the scanning optical device in the third embodiment of the present invention.

FIG. 10 is an explanatory view showing paraxial aberrations (curvatures of field in the main scanning and sub-scanning directions, distortion, and the like) in this embodiment. As can be seen from FIG. 10, all the aberrations, i.e., the curvatures of field in the main scanning and sub-scanning directions and distortion, are satisfactorily corrected.

In this embodiment, since the first diffractive optical element 64 is added to the fourth optical element in the arrangement of the second embodiment, curvatures of field in the main scanning and sub-scanning directions, and distortion are precisely corrected, thus allowing more accurate printing.

In this embodiment, since the maximum incidence angle $θ_i$ of a light beam incident on the surface of the photosensitive drum 21 in the deflection plane (main scanning plane) can be as small as $θ_i$=23.0°, as in the second embodiment, thus providing a scanning optical system (scanning optical element) which is less vulnerable to color misregistration due to attachment errors of the photosensitive drum 21 and the like and decentered rotation of the drum 21, and allows accurate registration.

Also, in this embodiment, since the optical length L from the rotation axis of the light deflector 5 to the surface of the photosensitive drum 21 is set to be smaller than the length W of the effective scanning range, registration errors due to various variations can be minimized.

As described above, in this embodiment, since the toric lens 61 and first diffractive optical element 64, which are placed on the side of the light deflector 5, and the compound optical element 63, which is placed on the side of the surface of the photosensitive drum 21 and combines the cylinder lens 63a and second diffractive optical element 63b, are used as the scanning optical element 26 of the scanning optical device 11, and the plurality of scanning optical devices 11, 12, 13, and 14 record images on the surfaces of the plurality of photosensitive drums 21, 22, 23, and 24, a low-cost, simple color image forming apparatus which suffers fewer registration errors among colors can be realized.

Figure 11:
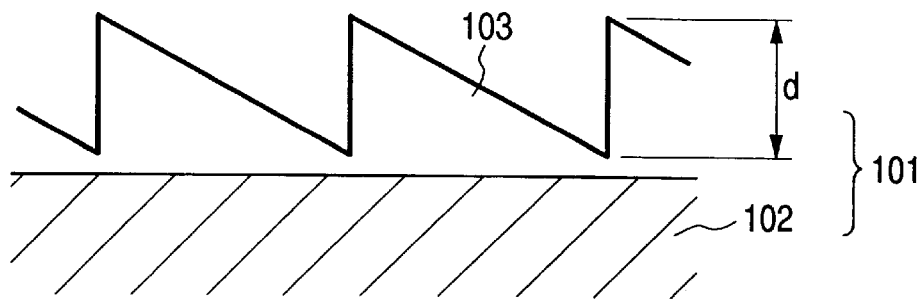
FIG. 11 is an explanatory view of a diffractive optical element associated with the present invention.
Figure 13:
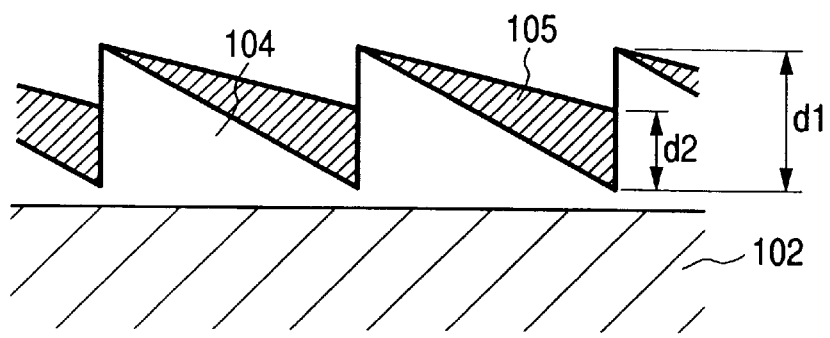
FIG. 13 is an explanatory view of a diffractive optical element associated with the present invention.

As the structure of the diffractive optical element used in each embodiment, a cuneiform, single-layered structure having one layer, as shown in, e.g., FIG. 11, or a two-layered structure obtained by stacking two layers having different grating thicknesses, as shown in FIG. 13, or the like, may be used.

Figure 12:
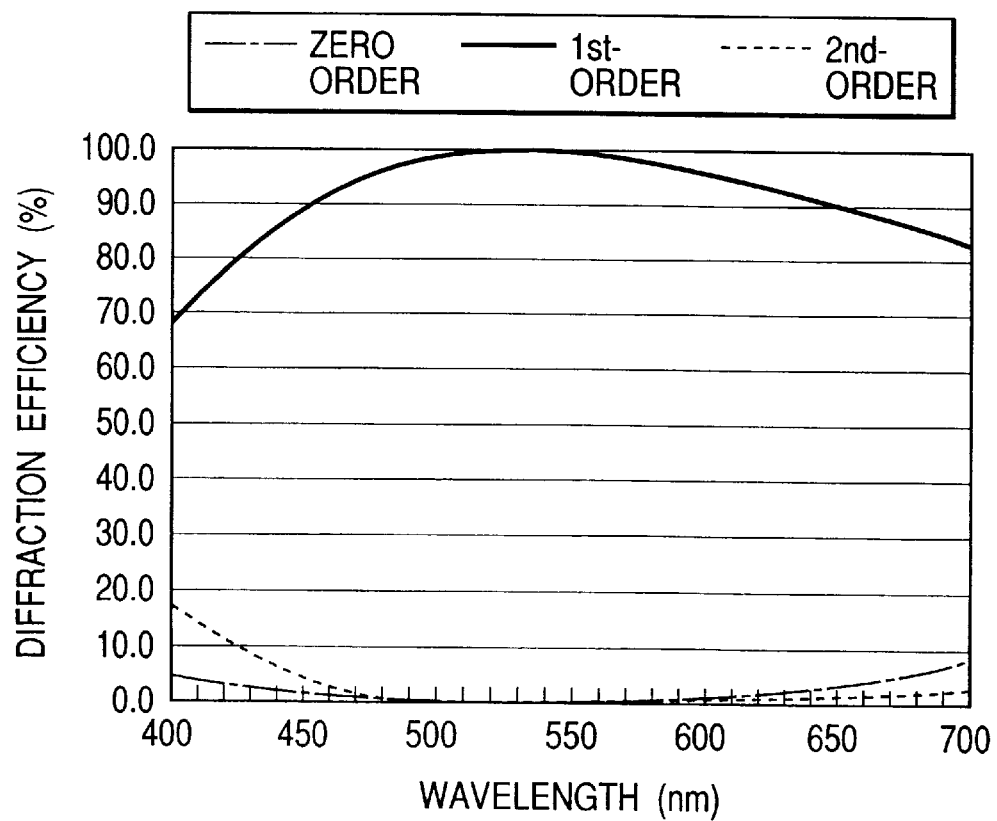
FIG. 12 is an explanatory graph illustrating the wavelength dependence characteristics of a diffractive optical element associated with the present invention.

FIG. 12 shows the wavelength dependence characteristics of the diffraction efficiency of the 1st-order diffracted light of a diffractive optical element 101 shown in FIG. 11. In the structure of the diffractive optical element 101, the surface of a substrate 102 is coated with an ultraviolet-setting resin, and a layer 103 having a grating thickness d, which can achieve a diffraction efficiency of the 1st-order diffracted light of 100% at a wavelength of 530 nm, is formed on the resin portion.

As is apparent from FIG. 12, the diffraction efficiency of the design order lowers as it deviates from the optimized wavelength of 530 nm, while the diffraction efficiency of the zero-order diffracted light and 2nd-order diffracted light increases. Any increase in diffracted light other than the design order produces flare, which leads to a drop of resolution of the optical system.

Figure 14:
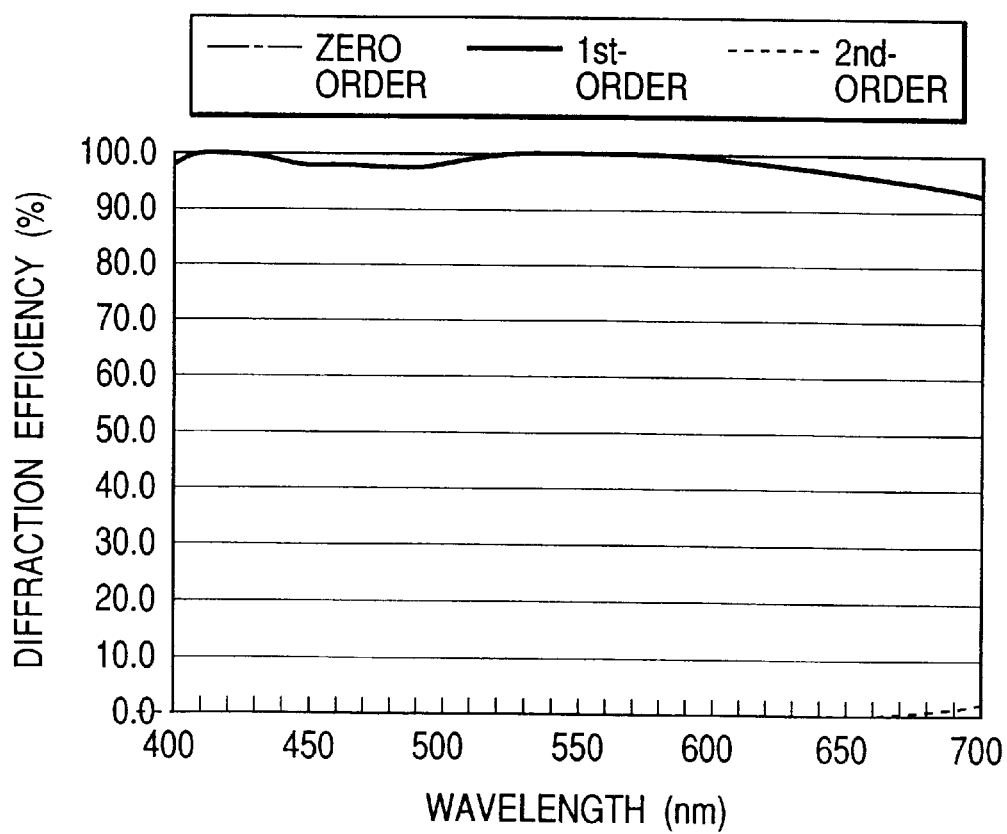
FIG. 14 is an explanatory graph illustrating the wavelength dependence characteristics of a diffractive optical element associated with the present invention.

FIG. 14 shows the wavelength dependence characteristics of the diffraction efficiency of 1st-order diffracted light of a multilayered diffractive optical element prepared by stacking two layers 104 and 105, as shown in FIG. 13.

Referring to FIG. 13, a first layer 104 consisting of an ultraviolet-setting resin (nd=1.499, vd=54) is formed on a substrate 102, and a second layer 105 consisting of another ultraviolet-setting resin (nd=1.598, vd=28) is formed on the first layer. In a combination of these materials, a grating thickness d1 of the first layer 104 is set at d1=13.8 μm, and a grating thickness d2 of the second layer 105 is set at d2=10.5 μm.

As can be seen from FIG. 14, since a diffractive optical element with a multilayered structure is used, the diffraction efficiency of the design order is as high as 95% or more over the entire wavelength range used.

Figure 15:
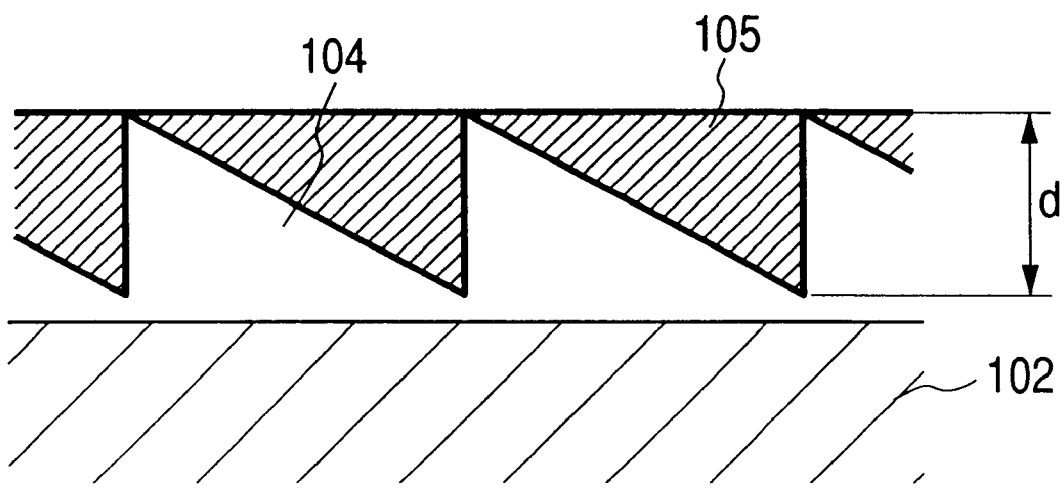
FIG. 15 is an explanatory view of a diffractive optical element associated with the present invention.

Note that the material of the above-mentioned diffractive optical element with a multilayered structure is not limited to ultraviolet-setting resins. Other plastic materials may be used, or the first layer 104 may be directly formed on the substrate, depending on the material of the substrate. The grating thicknesses need not always be different from each other. Depending on the combination of materials, the two layers 104 and 105 may have an equal grating thickness, as shown in FIG. 15.

In this case, since no grating pattern is formed on the surface of the diffractive optical element, high dustproof characteristics and easy assembly of the diffractive optical element can be assured.

According to the present invention, as described above, in a color image forming apparatus having a plurality of scanning optical devices, since each scanning optical device is set so that the distance from the rotation axis of a deflection element of the scanning optical device to a corresponding image carrier is smaller than the length of the effective scanning range of the image carrier, and an incidence angle $\theta_i$ of a light beam that strikes the image carrier surface in the main scanning plane is equal to or smaller than 27° in the entire effective scanning range, the color image forming apparatus can be compact, can minimize registration errors due to various variations (initial e.g., condition and environmental variations of the color image forming apparatus main body) and can reduce color misregistration by a simple arrangement.

A method of satisfactorily correcting changes in aberration due to environmental variations (e.g., a temperature variation and a wavelength variation of a semiconductor laser resulting from the temperature variation) of a scanning optical device and its optical element as another feature of the present invention will be explained below. Note that the arrangement of the apparatus is the same as the first embodiment described above, and the following explanation will be given using the scanning optical device (first embodiment) shown in FIG. 4.

A scanning optical element 6 serves as a third optical element having f-θ characteristics, and has refractive and diffractive portions. The refractive portion comprises a single, plastic toric lens 61 having different powers in the main scanning and sub-scanning directions, and the two surfaces of the toric lens 61 in the main scanning direction have an aspherical shape. The diffractive portion comprises an elongated diffractive optical element 62 having different powers in the main scanning and sub-scanning directions. In this embodiment, the toric lens 61 is placed on the light deflector 5 side of the middle point between a rotation axis O of a light deflector 5 and the surface of a photosensitive drum 21 (the surface to be scanned), and the diffractive optical element 62 is placed on photosensitive drum 21 side of the middle point. The scanning optical element 6 images a light beam based on image information deflected by the light deflector 5 on the surface of the photosensitive drum 21, and corrects any tilt of the deflection surface 5a of the light deflector 5 in the sub-scanning section. Note that the diffractive optical element 62 in this embodiment is a plastic element manufactured by injection molding. However, the present invention is not limited to such specific element, and a diffraction grating may be manufactured on a glass substrate by replica to obtain the same effect.

In this embodiment, changes in aberration in the main scanning and sub-scanning directions on the surface of the photosensitive drum 21 due to environmental variations (e.g., a temperature variation and a wavelength variation of a semiconductor laser resulting from the temperature variation) of the scanning optical device 11 are corrected by changes in power (power ratio) between the toric lens 61 and diffractive optical element 62. A change in aberration in the main scanning direction is a change in magnification and/or a change in focus, and a change in aberration in the sub-scanning direction is a change in focus.

Figure 16:
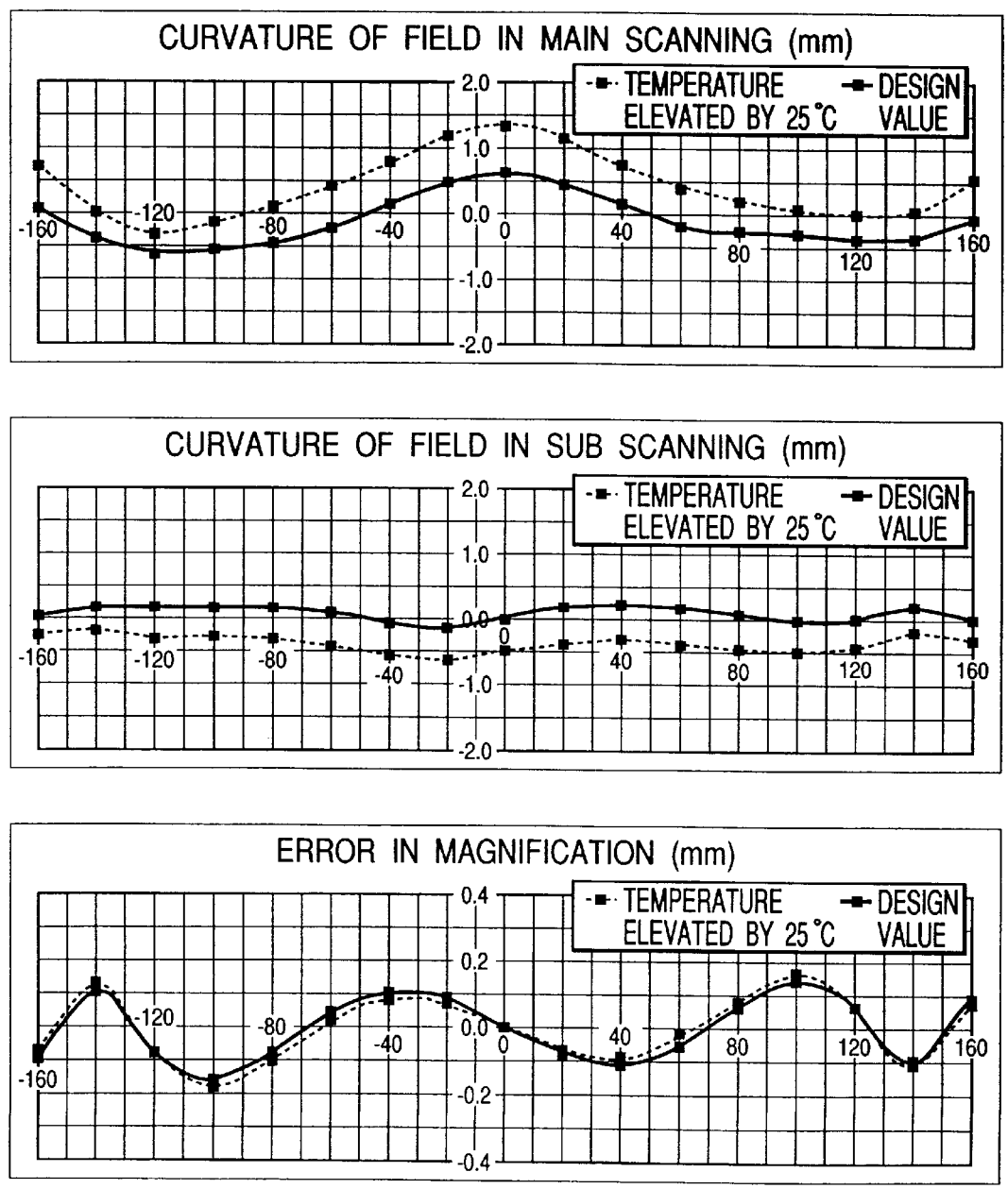
FIG. 16 is a chart showing paraxial aberrations of the scanning optical device according to the first embodiment of the present invention.

FIG. 16 is an explanatory view showing paraxial aberrations (curvatures of field in the main scanning and sub-scanning directions, error in magnification (position), and the like) before and after environmental variations in this embodiment. Each solid curve represents the characteristics (design value) before environmental variations (ordinary temperature of 25° C.) and each broken curve represents characteristics at 50° C., i.e., when the temperature of the scanning optical device has risen by 25° C.

In general, upon forming a color image by recording image information in units of colors on the surfaces of a plurality of photosensitive drums using a plurality of scanning optical devices, in order to visually eliminate registration errors and image density nonuniformity among colors, an error in magnification due to environmental variations (e.g., a temperature variation and a wavelength variation of the semiconductor laser resulting from the temperature variation) must be reduced to 40 μm or less, and errors in focus in the main scanning and sub-scanning directions must be reduced to ±1.0 mm or less.

In this embodiment, as shown in FIG. 16, an error in magnification (position) in the main scanning direction due to temperature elevation of +25° C. is 31 μm, which can suppress an error in pixel (position) to below around ¾ pixels in the case of, e.g., a printer having a resolution of 600 dpi. Also, the error in focus in the main scanning direction is +0.7 mm, and that in the sub-scanning direction is −0.5 mm, both of which are visually negligible levels.

Note that the behavior upon temperature elevation has been mainly described in this embodiment. However, with other environmental variations such as temperature drop, similar effects can be expected.

In this embodiment, these environmental variations are compensated for by plastic optical elements, thus simultaneously achieving a reduction of manufacturing cost by molding, and a short optical path length resulting from large field angle aberration correction using aspherical surfaces.

As described above, in this embodiment, since the toric lens 61 and diffractive optical element 62 are used as the scanning optical element 6 of the scanning optical device 11, and the plurality of scanning optical devices 11, 12, 13, and 14 record images on the surfaces of the plurality of photosensitive drums 21, 22, 23, and 24, a low-cost, simple color image forming apparatus which can minimize errors in registration among colors owing to environmental variations such as temperature elevation, and can reduce image density nonuniformity among colors, can be realized.

Note that the color image forming apparatus of this embodiment comprises a plurality of scanning optical devices and a plurality of corresponding photosensitive drums. However, the present invention can be similarly applied to an apparatus comprising a single photosensitive drum. In such case, a plurality of light beams output from a plurality of scanning optical devices are guided to different regions on the single photosensitive drum to scan the photosensitive drum surface, thus forming a color image. In this embodiment, changes in aberration on the photosensitive drum surface, which have been produced by environmental changes, are compensated for in both the main scanning and sub-scanning directions. However, even when such changes are compensated in only the main scanning direction, a satisfactory color image can be obtained.

The following explanation will be given using the scanning optical device (second embodiment) shown in FIG. 7.

This embodiment is different from the first embodiment described previously in that a compound optical element 63 that combines a cylinder lens (cylindrical lens) 63a having a power in the main scanning direction, and a diffractive optical element 63b having different powers in the main scanning and sub-scanning directions is used in place of the elongated diffractive optical element 62. Other arrangements and optical effects are substantially the same as those in the first embodiment, thus obtaining similar effects.

More specifically, a scanning optical element 16 serves as a third optical element having f-θ characteristics, and has a single, plastic toric lens 61, which serves as a first refractive portion and has different powers in the main scanning and sub-scanning directions, and a compound optical element (elongated diffractive element) 63 that combines a single, plastic cylinder lens 63a, which serves as a second refractive portion and has a power in the main scanning direction, and a diffractive optical element 63b, which serves as a diffractive portion and has different powers in the main scanning and sub-scanning directions.

In this embodiment, changes in aberration in the main scanning and sub-scanning directions on the surface of the photosensitive drum 21 due to environmental variations (e.g., a temperature variation and a wavelength variation of a semiconductor laser resulting from the temperature variation) of the scanning optical device 11 are corrected by changes in power (power ratio) between the toric lens 61 and compound optical element 63.

Figure 17:
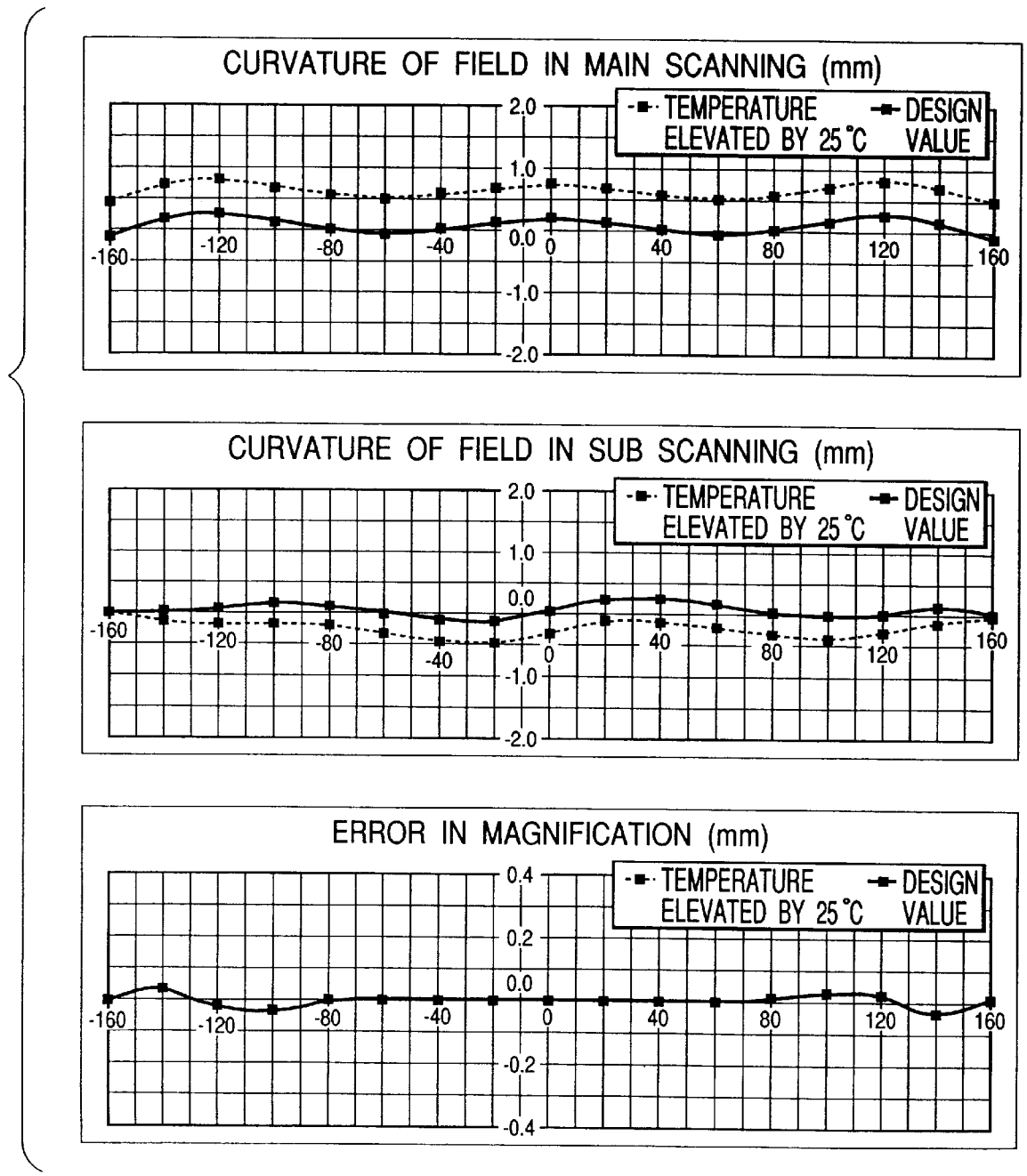
FIG. 17 is a chart showing paraxial aberrations of the scanning optical device according to the second embodiment of the present invention.

FIG. 17 is an explanatory view showing paraxial aberrations (curvatures of field in the main scanning and sub-scanning directions, error in magnification (position), and the like) before and after environmental variations in this embodiment. Each solid curve represents the characteristics (design value) before environmental variations (ordinary temperature of 25° C.) and each broken curve represents characteristics at 50° C., i.e., when the temperature of the scanning optical device has risen by 25° C.

In this embodiment, since the elongated diffractive optical element 63b is combined with the cylinder lens 63a having a power in the main scanning direction, an error in magnification (position) in the main scanning direction can be compensated more accurately.

In this embodiment, as shown in FIG. 17, an error in magnification (position) in the main scanning direction due to temperature elevation of +25° C. is 4 μm, which can suppress an error in pixel (position) to below around ¹⁄₁₀ pixel in case of, e.g., a printer having a resolution of 600 dpi. Also, the error in focus in the main scanning direction is +0.6 mm, and that in the sub-scanning direction is −0.4 mm, both of which are visually negligible levels.

In this embodiment, these environmental variations are compensated for by plastic optical elements, thus simultaneously achieving a reduction of the manufacturing cost by molding, and a short optical path length resulting from large field angle aberration correction using aspherical surfaces.

As described above, in this embodiment, since the toric lens 61 and the compound optical element 63 that combines the cylinder lens 63a and diffractive optical element 63b are used as the scanning optical element 16 of the scanning optical device 11, and the plurality of scanning optical devices 11, 12, 13, and 14 record images on the surfaces of the plurality of photosensitive drums 21, 22, 23, and 24, a low-cost, simple color image forming apparatus which can minimize errors in registration among colors owing to environmental variations such as temperature elevation, and can reduce image density nonuniformity among colors, can be realized.

The following explanation will be given using the scanning optical device (third embodiment) shown in FIG. 9.

This embodiment is different from the second embodiment described previously in that a diffractive optical element 64 having a power in the main scanning direction is placed in the vicinity of the toric lens 61. Other arrangements and optical effects are the same as those in the second embodiment, thus obtaining the same effect.

More specifically, referring to FIG. 9, a scanning optical element 26 serves as a third optical element having f-θ characteristics, and has a single, plastic toric lens 61, which serves as a first refractive portion and has different powers in the main scanning and sub-scanning directions, a first diffractive optical element 64, which serves as a first diffractive portion placed in the vicinity of the toric lens 61 and has a power in the main scanning direction, and a compound optical element (elongated diffractive element) 63. Compound optical element 64 combines a single, plastic cylinder lens 63a, which serves as a second refractive portion and has a power in the main scanning direction, and a second diffractive optical element 63b, which serves as a second diffractive portion and has powers in the main scanning and sub-scanning directions.

In this embodiment, changes in aberration in the main scanning and sub-scanning directions on the surface of the photosensitive drum 21 due to environmental variations (e.g., a temperature variation and a wavelength variation of a semiconductor laser resulting from the temperature variation) of the scanning optical device 11 are corrected by changes in power (power ratio) between the toric lens 61, the first diffractive optical element 64, and compound optical element 63.

Figure 18:
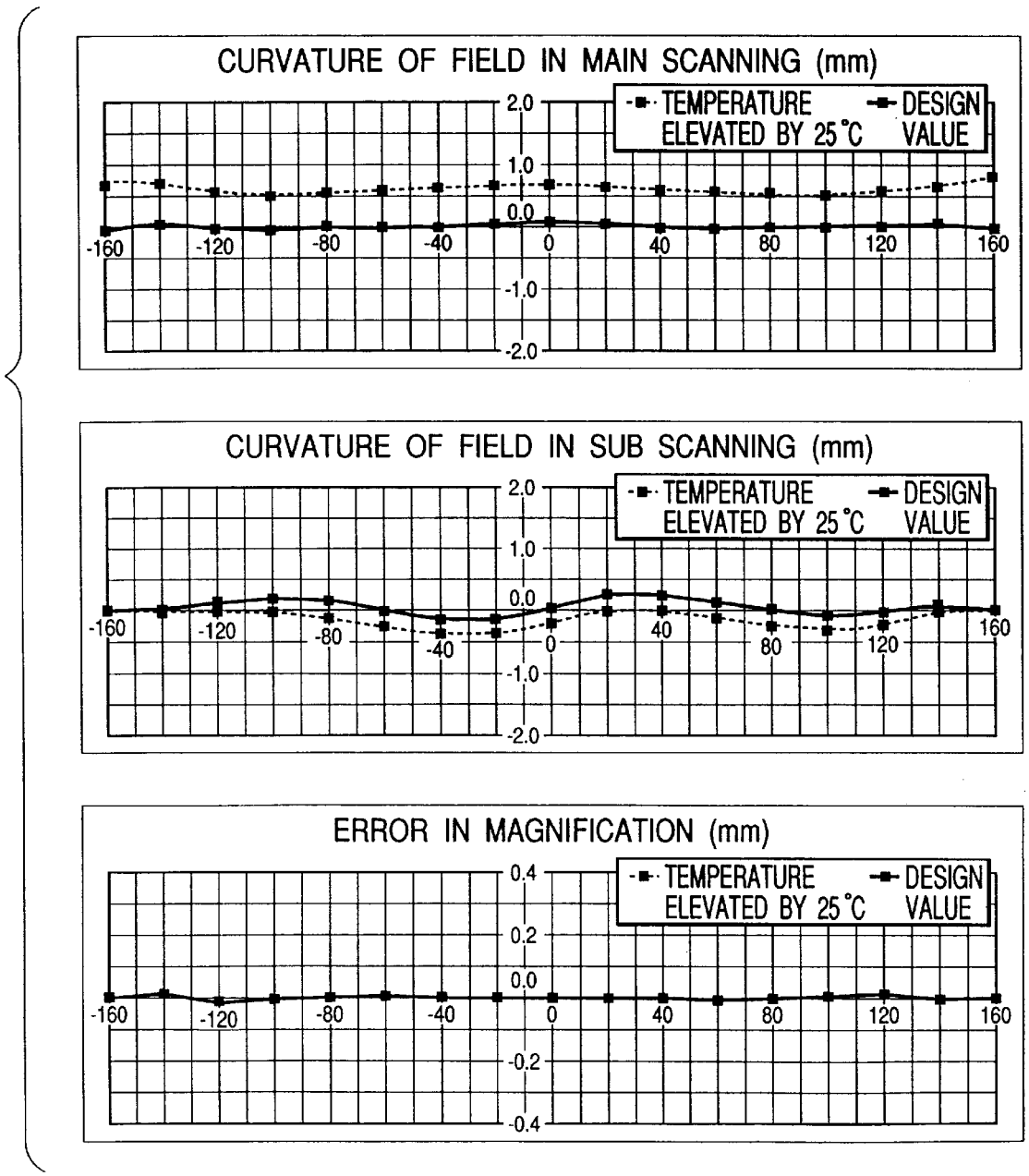
FIG. 18 is a chart showing paraxial aberrations of the scanning optical device according to the third embodiment of the present invention.

FIG. 18 is an explanatory view showing paraxial aberrations (curvatures of field in the main scanning and sub-scanning directions, error in magnification (position), and the like) before and after environmental variations in this embodiment. Each solid curve represents the characteristics (design value) before environmental variations (ordinary temperature of 25° C.) and each broken curve represents characteristics at 50° C., i.e., when the temperature of the scanning optical device has risen by 25° C.

In this embodiment, since the first diffractive optical element 64 having a power in the main scanning direction is placed in the vicinity of the toric lens 61 in addition to the component optical element 63, an error in magnification (position) in the main scanning direction can be compensated more accurately, and the design values of curvatures of field and distortion can be made nearly completely zero.

In this embodiment, as shown in FIG. 18, an error in magnification (position) in the main scanning direction due to temperature elevation of +25° C. is 2 μm, which can suppress an error in pixel (position) to below around ¹⁄₂₀ pixel in case of, e.g., a printer having a resolution of 600 dpi. Also, the error in focus in the main scanning direction is +0.6 mm, and that in the sub-scanning direction is −0.2 mm, both of which are visually negligible levels. Also, the design values (before environmental variations) of aberrations can also be kept at a satisfactorily low level, as shown in FIG. 18.

In this embodiment, these environmental variations are compensated for by plastic optical elements, thus simultaneously achieving a reduction of the manufacturing cost by molding, and a reduced optical path length resulting from large field angle aberration correction using aspherical surfaces.

As described above, in this embodiment, since the toric lens 61, first diffractive optical element 64, and compound optical element 63 that combines the cylinder lens 63a and second diffractive optical element 63b are used as the scanning optical element 26 of the scanning optical device 11, and the plurality of scanning optical devices 11, 12, 13, and 14 record images on the surfaces of the plurality of photosensitive drums 21, 22, 23, and 24, a low-cost, simple color image forming apparatus which can minimize errors in registration among colors owing to environmental variations such as temperature elevation, and can reduce image density nonuniformity among colors, can be realized.

As the structure of the diffractive optical element used in each embodiment, a cuneiform, single-layered structure having one layer, as shown in, e.g., FIG. 11, or a two-layered structure obtained by stacking two layers having different (or equal) grating thicknesses, as shown in FIG. 13, or the like, may be used.

FIG. 12 shows the wavelength dependence characteristics of the diffraction efficiency of the 1st-order diffracted light of a diffractive optical element 101 shown in FIG. 11. In the structure of the diffractive optical element 101, the surface of a substrate 102 is coated with an ultraviolet-setting resin, and a layer 103 having a grating thickness d, which can result in a diffraction efficiency of the 1st-order diffracted light of 100% at a wavelength of 530 nm, is formed on the resin portion.

As is apparent from FIG. 12, as the wavelength deviates from the optimized wavelength of 530 nm, the diffraction efficiency of the design order lowers while the diffraction efficiency of the zero-order diffracted light and 2nd-order diffracted light near the design order increases. An increase in diffracted light other than the design order produces flare, which leads to a drop of resolution of the optical system.

FIG. 14 shows the wavelength dependence characteristics of the diffraction efficiency of 1st-order diffracted light of a multilayered diffractive optical element prepared by stacking two layers 104 and 105, as shown in FIG. 13.

Referring to FIG. 13, a first layer 104 consisting of an ultraviolet-setting resin (nd=1.499, vd=54) is formed on a substrate 102, and a second layer 105 consisting of another ultraviolet-setting resin (nd=1.598, vd=28) is formed on that layer. In a combination of these materials, a grating thickness d1 of the first layer 104 is set at d1=13.8 μm, and a grating thickness d2 of the second layer 105 is set at d2=10.5 μm.

As can be seen from FIG. 14, since a diffractive optical element with a multilayered structure is used, the diffraction efficiency of the design order is as high as 95% or more over the entire wavelength range used.

Note that the material of the above-mentioned diffractive optical element with a multilayered structure is not limited to the ultraviolet-setting resin. Other plastic materials may be used, or the first layer 104 may be directly formed on the substrate depending on the material of the substrate. The grating thicknesses need not always be different from each other. Depending on the combination of materials, the two layers 104 and 105 may have an equal grating thickness, as shown in FIG. 15.

In this case, since no grating pattern is formed on the surface of the diffractive optical element, high dustproof performance and easy assembly of the diffractive optical element can be assured.

According to the present invention, as described above, in a color image forming apparatus having a plurality of scanning optical devices, since changes in aberration due to environmental variations of each scanning optical device are corrected by changes in power between the refractive and diffractive portions of the scanning optical element of each device, a compact color image forming apparatus, which can minimize registration errors and image density nonuniformity among colors by a simple arrangement and suitable for high-resolution printing, can be achieved.

What is claimed is:

1. A color image forming apparatus comprising:
   light source means;
   a deflection element for deflecting a light beam emitted by said light source means;
   an image carrier;
   optical means for guiding the light beam emitted by said light source means onto a surface of said image carrier; and
   a plurality of scanning optical devices each including said light source means, deflection element, and optical means,
   wherein a distance from a rotation axis of said deflection element to said image carrier is smaller than a length of an effective scanning range on said image carrier, and
   an incidence angle of the light beam which becomes incident on said image carrier in a main scanning plane is not more than 27° in the entire effective scanning range.

2. An apparatus according to claim 1, wherein said light source means includes a semiconductor laser,
   said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and
   said third optical element includes a fourth optical element including at least one refractive optical element, and a fifth optical element including at least one diffractive optical element.

3. An apparatus according to claim 2, wherein said fourth optical element has a plastic toric lens.

4. An apparatus according to claim 2, wherein said fourth optical element has a plastic toric lens, and
   said fifth optical element has a component optical element which combines a cylinder lens and diffractive optical element.

5. An apparatus according to claim 2, wherein said fourth optical element has a plastic toric lens and first diffractive optical element, and
   said fifth optical element has a component optical element which combines a cylinder lens and second diffractive optical element.

6. An apparatus according to claim 2, wherein said fifth optical element is formed of plastic.

7. An apparatus according to claim 2, wherein a maximum exit angle $\theta_p$ the light beam deflected by said deflection element makes with an optical axis of said third optical element falls within a range from 40° to 60°.

8. An apparatus according to claim 1, wherein said light source means includes a semiconductor laser, said optical means has refractive and diffractive portions, and a change in aberration on the surface of said image carrier in a main scanning direction upon an environmental change of said scanning optical device is corrected by characteristics of said optical means.

9. An apparatus according to claim 1, wherein said light source means includes a semiconductor laser, said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and a change in aberration on the surface of said image carrier in a main scanning direction upon an environmental change of said scanning optical device is corrected by characteristics of said third optical element.

10. An apparatus according to claim 8, wherein the environmental variation includes a temperature variation and a wavelength variation of said semiconductor laser.

11. An apparatus according to claim 8, wherein the characteristics are changes in power between said refractive and diffractive portions of said optical means.

12. An apparatus according to claim 8, wherein the change in aberration is a change in magnification in the main scanning direction.

13. An apparatus according to claim 8, wherein the change in aberration is a change in focus in the main scanning direction.

14. An apparatus according to claim 8, wherein said refractive portion of said optical means has a plastic toric lens having different powers in main scanning and sub-scanning directions, and said diffractive portion of said optical means has a diffractive optical element having different powers in the main scanning and sub-scanning directions.

15. An apparatus according to claim 8, wherein said refractive portion of said optical means has a plastic toric lens having different powers in main scanning and sub-scanning directions, and a cylinder lens having a power in the main scanning direction, said diffractive portion of said optical means has a diffractive optical element having different powers in the main scanning and sub-scanning directions, and said cylinder lens and said diffractive optical element are combined to form a compound optical element.

16. An apparatus according to claim 8, wherein said refractive portion of said optical means has a plastic toric lens having different powers in main scanning and sub-scanning directions, and a cylinder lens having a power in the main scanning direction, said diffractive portion of said optical means has a first diffractive optical element having a power in the main scanning direction, and a second diffractive optical element having different powers in the main scanning and sub-scanning directions, and said first diffractive optical element is placed in the vicinity of said toric lens, and said cylinder lens and said second diffractive optical element are combined to form a compound optical element.

17. An apparatus according to claim 1, wherein said light source means includes a semiconductor laser, said optical means has refractive and diffractive portions, and changes in aberration on the surface of said image carrier in main scanning and sub-scanning directions upon an environmental change of said scanning optical device are corrected by characteristics of said optical means.

18. An apparatus according to claim 1, wherein said light source means includes a semiconductor laser, said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and changes in aberration on the surface of said image carrier in main scanning and sub-scanning directions upon an environmental change of said scanning optical device are corrected by characteristics of said third optical element.

19. An apparatus according to claim 17, wherein the environmental variation includes a temperature variation and a wavelength variation of said semiconductor laser.

20. An apparatus according to claim 17, wherein the characteristics are changes in power between said refractive and diffractive portions of said optical means.

21. An apparatus according to claim 17, wherein the change in aberration in the main scanning direction is a change in magnification and/or change in focus, and the change in aberration in the sub-scanning direction is a change in focus.

22. An apparatus according to claim 17, wherein said refractive portion of said optical means has a plastic toric lens having different powers in the main scanning and sub-scanning directions, and said diffractive portion of said optical means has a diffractive optical element having different powers in the main scanning and sub-scanning directions.

23. An apparatus according to claim 17, wherein said refractive portion of said optical means has a plastic toric lens having different powers in main scanning and sub-scanning directions, and a cylinder lens having a power in the main scanning direction, said diffractive portion of said optical means has a diffractive optical element having different powers in the main scanning and sub-scanning directions, and said cylinder lens and said diffractive optical element are combined to form a compound optical element.

24. An apparatus according to claim 17, wherein said refractive portion of said optical means has a plastic toric lens having different powers in main scanning and sub-scanning directions, and a cylinder lens having a power in the main scanning direction, said diffractive portion of said optical means has a first diffractive optical element having a power in the main scanning direction, and a second diffractive optical element having different powers in the main scanning and sub-scanning directions, and said first diffractive optical element is placed in the vicinity of said toric lens, and said cylinder lens and said second diffractive optical element are combined to form a compound optical element.

25. A scanning optical device comprising:

light source means;

a deflection element for deflecting a light beam emitted by said light source means; and optical means for guiding the light beam emitted by said light source means onto a surface of an image carrier;

wherein a distance from a rotation axis of said deflection element to said image carrier is smaller than a length of an effective scanning range on said image carrier, and an incidence angle of the light beam which becomes incident on said image carrier in a main scanning plane is not more than 27° in the entire effective scanning range.

26. A device according to claim 25, wherein said light source means includes a semiconductor laser, said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and said third optical element includes a fourth optical element including at least one refractive optical element, and a fifth optical element including at least one diffractive optical element.

27. A device according to claim 26, wherein said fourth optical element has a plastic toric lens.

28. A device according to claim 26, wherein said fourth optical element has a plastic toric lens, and said fifth optical element has a component optical element which combines a cylinder lens and diffractive optical element.

29. A device according to claim 26, wherein said fourth optical element has a plastic toric lens and first diffractive optical element, and said fifth optical element has a component optical element which combines a cylinder lens and second diffractive optical element.

30. A device according to claim 26, wherein said fifth optical element is formed of plastic.

31. A device according to claim 26, wherein a maximum exit angle $\theta_p$ the light beam deflected by said deflection element makes with an optical axis of said third optical element falls within a range from 40° to 60°.

32. A device according to claim 25, wherein said light source means includes a semiconductor laser, said optical means has refractive and diffractive portions, and a change in aberration on the surface of said image carrier in a main scanning direction upon an environmental change of said scanning optical device is corrected by characteristics of said optical means.

33. A device according to claim 25, wherein said light source means includes a semiconductor laser, said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and a change in aberration on the surface of said image carrier in a main scanning direction upon an environmental change of said scanning optical device is corrected by characteristics of said third optical element.

34. A device according to claim 32, wherein the environmental variation includes a temperature variation and a wavelength variation of said semiconductor laser.

35. A device according to claim 32, wherein the characteristics are changes in power between said refractive and diffractive portions of said optical means.

36. A device according to claim 32, wherein the change in aberration is a change in magnification in the main scanning direction.

37. A device according to claim 32, wherein the change in aberration is a change in focus in the main scanning direction.

38. A device according to claim 32, wherein said refractive portion of said optical means has a plastic toric lens having different powers in main scanning and sub-scanning directions, and said diffractive portion of said optical means has a diffractive optical element having different powers in the main scanning and sub-scanning directions.

39. A device according to claim 32, wherein said refractive portion of said optical means has a plastic toric lens having different powers in main scanning and sub-scanning directions, and a cylinder lens having a power in the main scanning direction, said diffractive portion of said optical means has a diffractive optical element having different powers in the main scanning and sub-scanning directions, and said cylinder lens and said diffractive optical element are combined to form a compound optical element.

40. A device according to claim 32, wherein said refractive portion of said optical means has a plastic toric lens having different powers in main scanning and sub-scanning directions, and a cylinder lens having a power in the main scanning direction, said diffractive portion of said optical means has a first diffractive optical element having a power in the main scanning direction, and a second diffractive optical element having different powers in the main scanning and sub-scanning directions, and said first diffractive optical element is placed in the vicinity of said toric lens, and said cylinder lens and said second diffractive optical element are combined to form a compound optical element.

41. A device according to claim 25, wherein said light source means includes a semiconductor laser, said optical means has refractive and diffractive portions, and changes in aberration on the surface of said image carrier in main scanning and sub-scanning directions upon an environmental change of said scanning optical device are corrected by characteristics of said optical means.

42. A device according to claim 25, wherein said light source means includes a semiconductor laser, said optical means includes a first optical element for converting the light beam emitted by said light source means into a substantially collimated light beam, a second optical element for focusing the substantially collimated light beam to form a linear image which is elongated in a main scanning direction of a deflection surface of said deflection element, and a third optical element for focusing the light beam deflected by said deflection element to form a beam spot on the surface of said image carrier, and changes in aberration on the surface of said image carrier in main scanning and sub-scanning directions upon an environmental change of said scanning optical device are corrected by characteristics of said third optical element.

43. A device according to claim 41, wherein the environmental variation includes a temperature variation and a wavelength variation of said semiconductor laser.

44. A device according to claim 41, wherein the characteristics are changes in power between said refractive and diffractive portions of said optical means.

45. A device according to claim 41, wherein the change in aberration in the main scanning direction is a change in magnification and/or change in focus, and the change in aberration in the sub-scanning direction is a change in focus.

46. A device according to claim 41, wherein said refractive portion of said optical means has a plastic toric lens having different powers in the main scanning and sub-scanning directions, and said diffractive portion of said optical means has a diffractive optical element having different powers in the main scanning and sub-scanning directions.

47. A device according to claim 41, wherein said refractive portion of said optical means has a plastic toric lens having different powers in main scanning and sub-scanning directions, and a cylinder lens having a power in the main scanning direction, said diffractive portion of said optical means has a diffractive optical element having different powers in the main scanning and sub-scanning directions, and said cylinder lens and said diffractive optical element are combined to form a compound optical element.

48. A device according to claim 41, wherein said refractive portion of said optical means has a plastic toric lens having different powers in main scanning and sub-scanning directions, and a cylinder lens having a power in the main scanning direction, said diffractive portion of said optical means has a first diffractive optical element having a power in the main scanning direction, and a second diffractive optical element having different powers in the main scanning and sub-scanning directions, and said first diffractive optical element is placed in the vicinity of said toric lens, and said cylinder lens and said second diffractive optical element are combined to form a compound optical element.

* * * * *

UNITED STATES PATENT AND TRADEMARK OFFICE
CERTIFICATE OF CORRECTION

PATENT NO. : 6,038,053
DATED : March 14, 2000
INVENTOR(S) : Manabu Kato

It is certified that error appears in the above-identified patent and that said Letters Patent is hereby corrected as shown below:

Column 2,
Line 45, "changes" should be deleted.

Column 7,
Line 13, "toric" should read -- toric lens --.
Line 18, "is" (first occurrence), should read -- as --.

Column 7 and 8,
Table 1, fifth column, "-1.41591E+01" should read -- -1.41591E+02 --.
Table 1, fifth column, "-3.02404E-08" should be moved to sixth column.
Table 1, sixth column, "2.812267E-10" should read -- 2.81267E-10 --
Table 1, sixth column, "-2.51589E+-1" should read -- 2.51589E+01 --
Table 1, sixth column, "b2" should be moved to seventh column.
Table 1, eighth column, "-2.50725E-04" should be moved to the ninth column.
Table 1, column 4, last row " Suffix s incicates side opposite to laser" should read -- Suffix e indicates side opposite to laser --.

Column 9,
Line 23, "be less than or equal to suppressed to be" should read -- be suppressed to be less than or equal to --.

Column 11,
Line 58, "taser" should read -- laser --.
Line 59, "Suffix s" should read -- Suffix e --.

Column 16,
Line 31, "(" should be deleted.
Line 32, "e.g.," should read -- (e.g., --.

UNITED STATES PATENT AND TRADEMARK OFFICE
CERTIFICATE OF CORRECTION

PATENT NO.    : 6,038,053
DATED         : March 14, 2000
INVENTOR(S)   : Manabu Kato It is certified that error appears in the above-identified patent and that said Letters Patent is hereby corrected as shown below:

<u>Column 20,</u>
Line 15, "and" should read -- and is --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*